US007769289B2

(12) United States Patent
Kawakami

(10) Patent No.: US 7,769,289 B2
(45) Date of Patent: Aug. 3, 2010

(54) CAMERA AND STROBE DEVICE

(75) Inventor: Chikuni Kawakami, Asaka (JP)

(73) Assignee: FUJIFILM Corporation, Tokyo (JP)

( * ) Notice: Subject to any disclaimer, the term of this patent is extended or adjusted under 35 U.S.C. 154(b) by 222 days.

(21) Appl. No.: 12/013,757

(22) Filed: Jan. 14, 2008

(65) Prior Publication Data
US 2008/0175579 A1    Jul. 24, 2008

(30) Foreign Application Priority Data

| Jan. 15, 2007 | (JP) | ............................. 2007-005993 |
| Mar. 29, 2007 | (JP) | ............................. 2007-089616 |

(51) Int. Cl.
  G03B 15/03    (2006.01)
  G03B 7/00     (2006.01)
  H04N 5/222    (2006.01)
(52) U.S. Cl. ...................... 396/155; 396/222; 396/225; 348/371
(58) Field of Classification Search ................ 396/14, 396/16, 155, 164, 182, 222, 225, 231; 348/223.1, 348/370, 371, 655; 362/11, 12, 18
See application file for complete search history.

(56) References Cited

U.S. PATENT DOCUMENTS

| 6,952,225 | B1 | 10/2005 | Hyodo et al. | |
| 2001/0030694 | A1* | 10/2001 | Abe | ........................... 348/223 |
| 2006/0250519 | A1* | 11/2006 | Kawakami | .................. 348/371 |
| 2006/0251408 | A1* | 11/2006 | Konno et al. | .................. 396/14 |

FOREIGN PATENT DOCUMENTS

| EP | 1 176 849 A2 | 1/2002 |
| EP | 1 701 590 A2 | 9/2006 |
| EP | 1 701 591 A2 | 9/2006 |
| JP | 5-196985 A | 8/1993 |
| JP | 2000-224608 A | 8/2000 |
| JP | 2001-333432 A | 11/2001 |
| JP | 2002-116481 A | 4/2002 |

* cited by examiner

Primary Examiner—W. B. Perkey
Assistant Examiner—Minh Q Phan
(74) Attorney, Agent, or Firm—Sughrue Mion, PLLC

(57) ABSTRACT

A camera which continuously performs shooting at predetermined time intervals in conjunction with one shutter release operation, comprises: a strobe light source which emits strobe light whose color temperature is adjustable; a light emission control device which controls the strobe light source to emit the strobe light in synchronization with each shooting in the continuous shooting; and a color temperature adjustment device which adjusts the color temperature of the strobe light emitted from the strobe light source for each shooting in the continuous shooting to vary color temperature with each shooting within a predetermined color temperature variable range which has been previously set. Thereby, even in a situation where the strobe light emission at a right color temperature is difficult, it is possible to perform the shooting with the strobe light emission at the color temperature intended by the shooter.

14 Claims, 16 Drawing Sheets

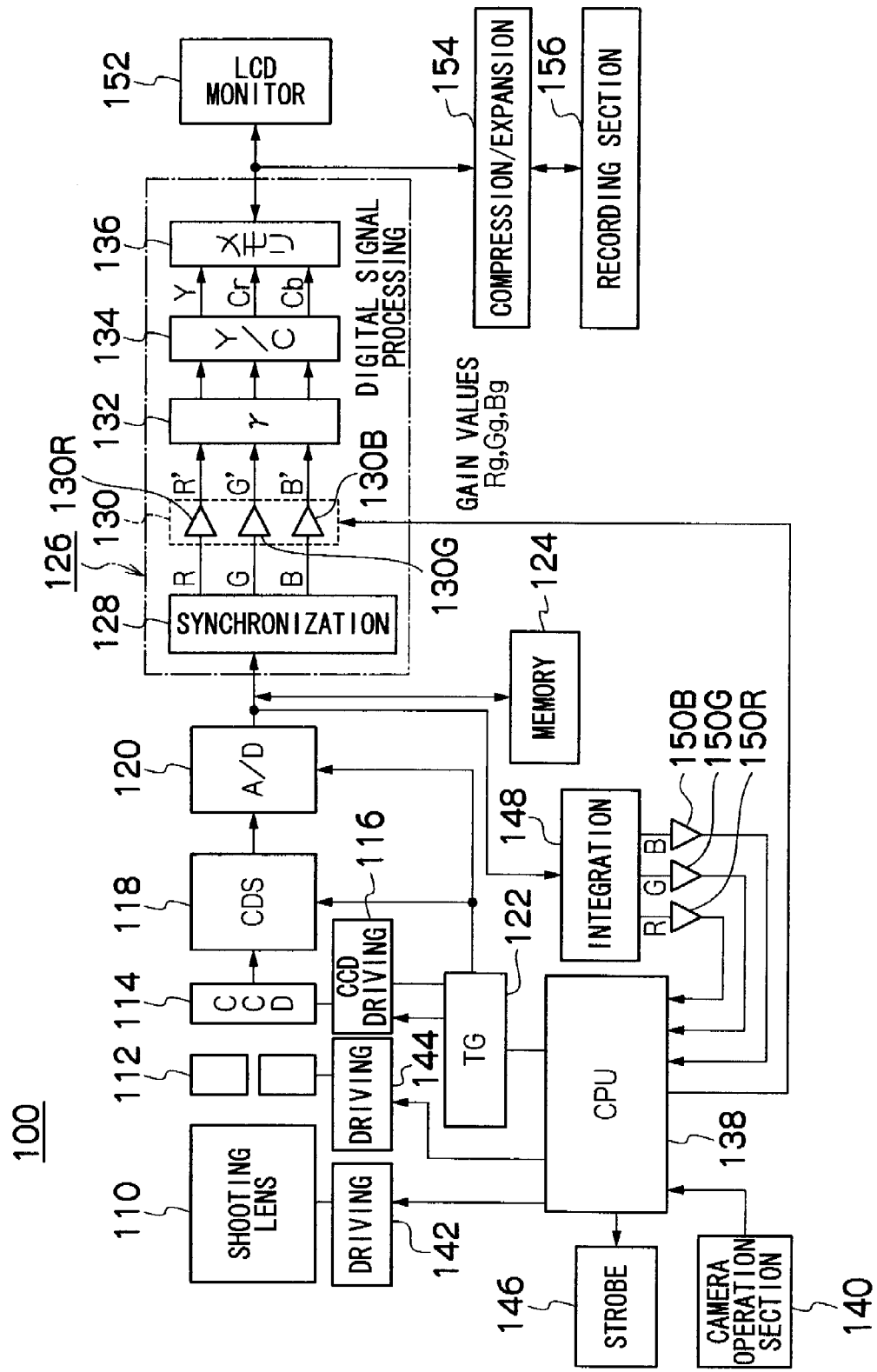

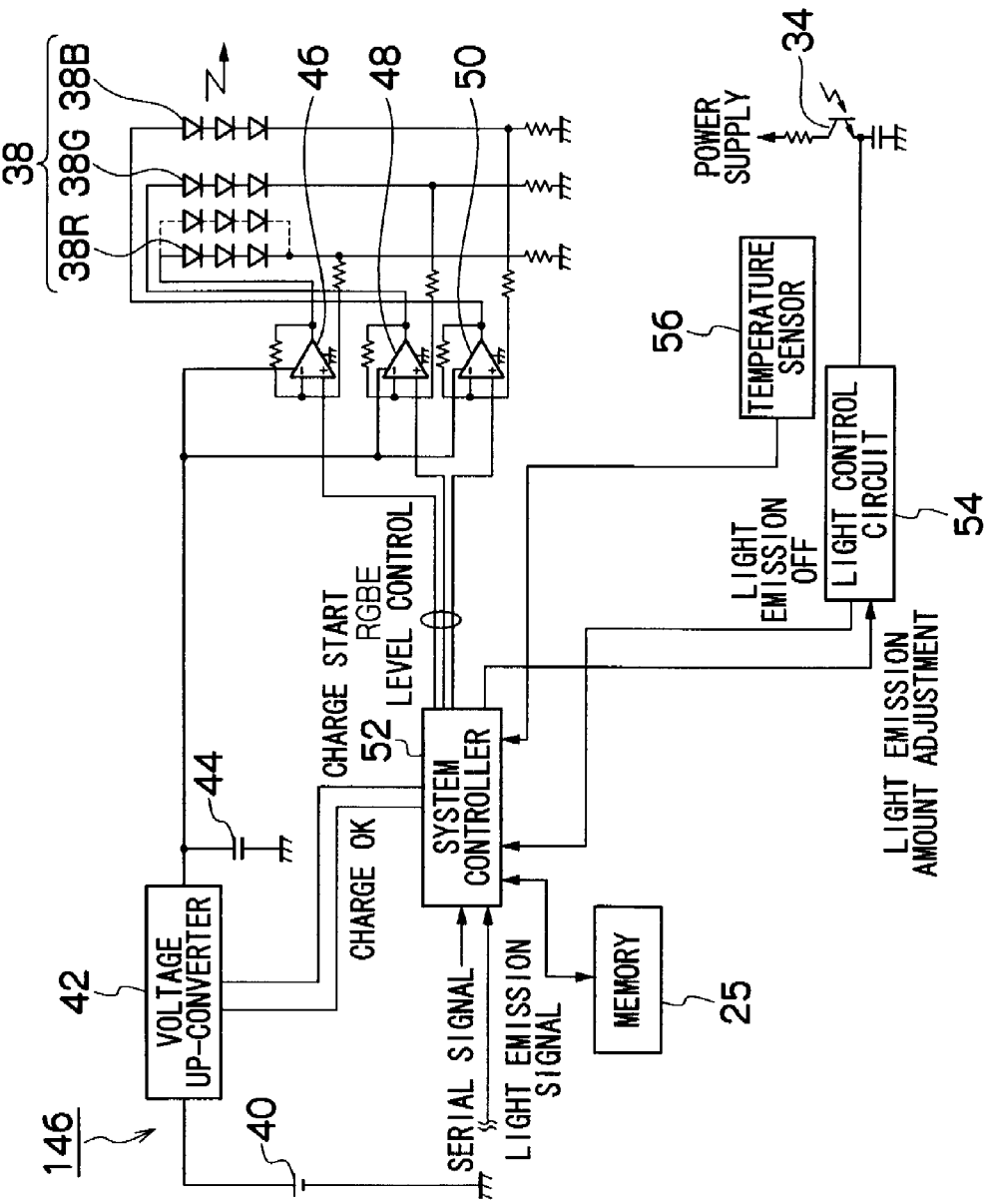

STANDBY

READ COLOR TEMPERATURE

SET R. G. B LIGHT EMISSION LEVELS

RELEASE (LIGHT EMISSION)

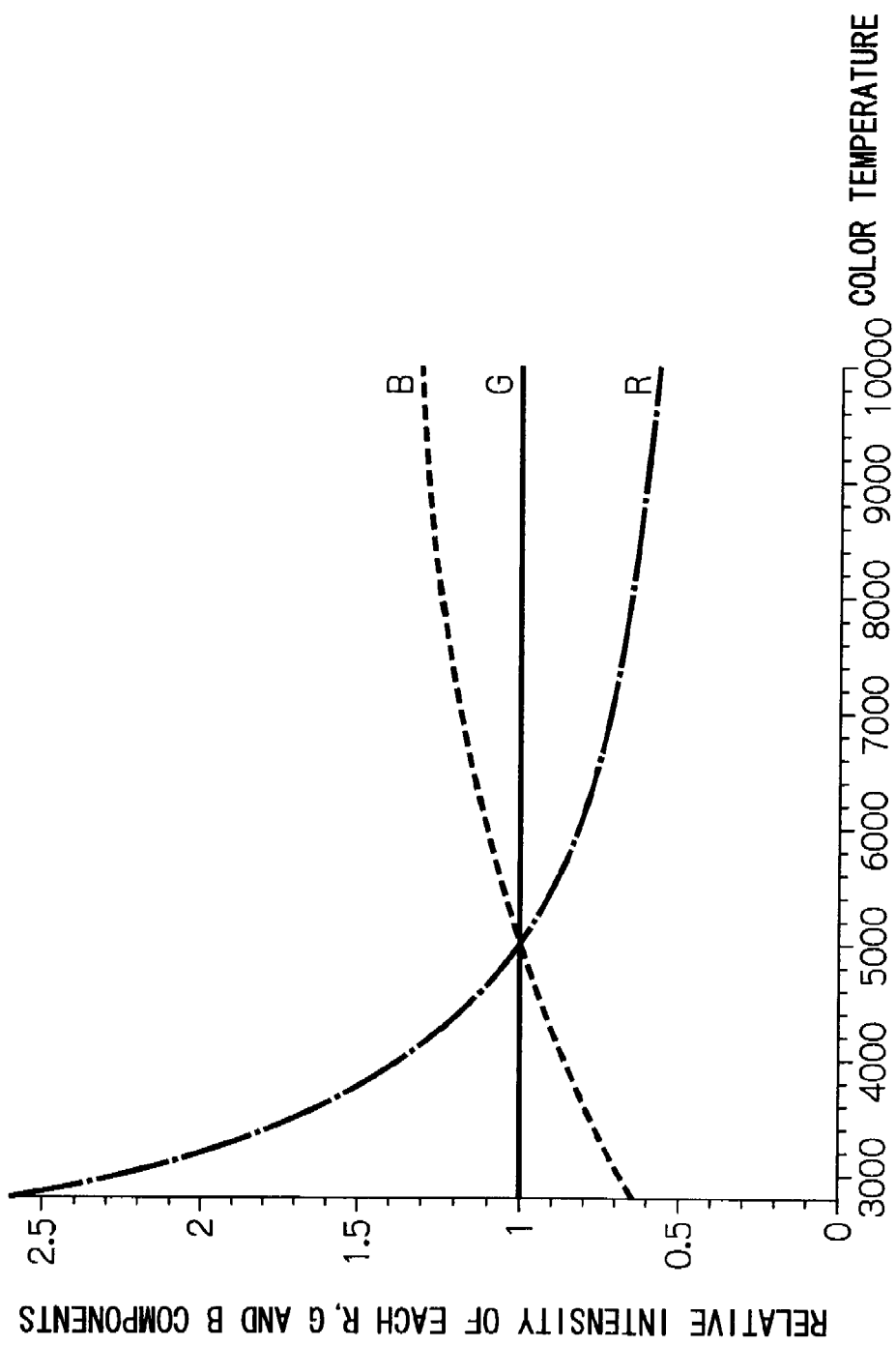

CAMERA AND STROBE DEVICE

BACKGROUND OF THE INVENTION

1. Field of the Invention

The present invention relates to a camera and a strobe device, and more particularly, to a camera and a strobe device which can vary a color temperature of an emitted light color of strobe light.

2. Description of the Related Art

A camera provided with an auto bracketing shooting function has been widely known in which multiple photos are continuously and automatically shot only with one release operation while the exposure value is varied stepwise, with respect to a determined exposure value of the camera, that is, shutter speed and an aperture value.

Japanese Patent Application Laid-Open No. 5-196985 describes a technique capable of quickly and accurately performing the auto bracketing shooting even if the auto bracketing shooting is performed by using a strobe device.

Moreover, among cameras such as digital still cameras, there is also a camera provided with a white balance bracketing shooting function in which a variable parameter for the bracketing shooting is white balance instead of the exposure value.

Japanese Patent Application Laid-Open No. 2001-333432 describes a technique of the white balance bracketing shooting function in which multiple photos can be continuously and automatically shot while the white balance is varied stepwise only with one release operation.

Moreover, a conventional strobe device of a camera uses a xenon tube as a light source. For example, if strobe shooting is performed in order to correct backlight under sunlight in the morning or the evening, since the xenon tube has spectral characteristics close to daylight colors, the photos may be in unnatural colors.

Japanese Patent Application Laid-Open No. 2002-116481 describes a technique in which a color temperature of an emitted light color can be manually or automatically varied by using light emitting elements of R, G and B, and for example, if the backlight under the sunlight in the morning or the evening is corrected, the backlight correction in accordance with a color temperature of the sunlight can be performed to eliminate unnaturalness due to a color temperature of strobe light at the time of the strobe shooting.

However, in the invention according to Japanese Patent Application Laid-Open No. 5-196985, although the images at an appropriate exposure can be obtained by using the strobe device, since a color temperature of a strobe light source is constant, for example, if the backlight under the sunlight in the morning or the evening is corrected, the photos may be in the unnatural colors.

Moreover, in the invention according to Japanese Patent Application Laid-Open No. 2001-333432, for example, if a strobe is used in order to correct the backlight under the sunlight in the morning or the evening, since the color temperature of the strobe light source and the color temperature of the sunlight are different, it is difficult to perform the shooting with good white balance for both a subject illuminated with the strobe light source and a background illuminated with the sunlight in the white balance bracketing shooting.

Moreover, in the invention according to Japanese Patent Application Laid-Open No. 2002-116481, if there is any error in measurement of a color temperature of a subject field, there is a problem that the color temperature of the strobe light which has been set based on a result of the measurement cannot match the color temperature of the subject field.

In the invention according to Japanese Patent Application Laid-Open No. 2002-116481, after the color temperature of the emitted light color has been manually or automatically set, it is necessary to convert the set color temperature into a ratio of light emission amounts of R, G and B. For this purpose, a method of having a correspondence table between the color temperature and the RGB ratio in an EEPROM or the like is conceivable.

However, even with the same color temperature difference, the colors significantly vary in an area of a low color temperature, while the colors insignificantly vary in an area of a high color temperature. Therefore, if RGB ratio data is held at regular intervals of the color temperature, there is a problem in which the color temperature cannot be finely set in the area of the low color temperature if the intervals of the color temperature are wide, and useless data increases in the area of the high color temperature if the intervals of the color temperature are narrow.

SUMMARY OF THE INVENTION

The present invention has been made in view of the above described circumstances, and it is an object of the present invention to provide a camera which can ensure strobe shooting with strobe light at a color temperature which is approximately same as a color temperature of a subject field even if there is any error in measurement, setting or the like of the color temperature of the subject field. Furthermore, it is another object of the present invention to provide a strobe device and a camera which can minimize required data of a ratio of light emission amounts of R, G and B, and can efficiently utilize a memory.

In order to achieve the above described object, according to a first aspect of the present invention, a camera which continuously performs shooting at predetermined time intervals in conjunction with one shutter release operation, comprises: a strobe light source which emits strobe light whose color temperature is adjustable; a light emission control device which controls the strobe light source to emit the strobe light in synchronization with each shooting in the continuous shooting; and a color temperature adjustment device which adjusts the color temperature of the strobe light emitted from the strobe light source for each shooting in the continuous shooting to vary color temperature with each shooting within a predetermined color temperature variable range which has been previously set.

In other words, since the shooting is continuously performed with the strobe light emission at each different color temperature, it is possible to perform the shooting with the strobe light emission at a color temperature intended by a shooter.

According to a second aspect of the present invention, the camera according to the first aspect further includes a color temperature detection device which detects a color temperature of a subject field, and the color temperature adjustment device adjusts the color temperature of the strobe light to vary color temperature within the predetermined color temperature variable range with the color temperature detected by the color temperature detection device at the center.

Thereby, the center of the color temperature of the strobe light which is continuously emitted can be set to the color temperature of the subject field.

According to a third aspect of the present invention, the camera according to the first aspect further includes a color temperature setting device which manually sets the color temperature including a light source type, and the color temperature adjustment device adjusts the color temperature of the strobe light to vary color temperature within the predetermined color temperature variable range with the color temperature set by the color temperature setting device at the center.

Thereby, the center of the color temperature of the strobe light which is continuously emitted can be set to the color temperature which has been manually set.

According to a fourth aspect of the present invention, the camera according to the first aspect further includes a scene selection device which selects a shooting scene, and the color temperature adjustment device adjusts the color temperature of the strobe light to vary color temperature within the predetermined color temperature variable range, depending on the shooting scene selected by the scene selection device.

Thereby, the center of the color temperature of the strobe light which is continuously emitted can be set to the color temperature depending on the shooting scene.

According to a fifth aspect of the present invention, in the camera according to the first aspect, the strobe light source comprises light emitting diodes of three colors of R, G and B.

According to a sixth aspect of the present invention, in the camera according to the fifth aspect, the color temperature adjustment device adjusts the color temperature by controlling a ratio of light emission amounts of R, G and B of the light emitting diodes of the three colors.

According to a seventh aspect of the present invention, the camera according to the sixth aspect further includes a storage device which stores the ratio of the light emission amounts of R, G and B of the light emitting diodes of the three colors for emitting the strobe light corresponding to each color temperature, for each color temperature at predetermined intervals. And the color temperature adjustment device reads a corresponding ratio of the light emission amounts of R, G and B from the storage device depending on the color temperature at which the light emission should be performed, and controls each of light emission amounts of the light emitting diodes of the three colors to match the read ratio of the light emission amounts of R, G and B.

According to an eighth aspect of the present invention, in the camera according to the seventh aspect, the storage device stores the ratio of the light emission amounts of R, G and B with the predetermined intervals varied according to the color temperature.

Thereby, the memory can be efficiently used.

In order to achieve the above described object, a strobe device according to a ninth aspect of the present invention comprises: a strobe light source which emits strobe light whose color temperature is adjustable, and is configured with light emitting elements of three colors of R, G and B whose respective light emission amounts can be independently controlled; a light emission control device which controls the strobe light source to emit the strobe light in synchronization with shooting; a storage device which stores ratios of the light emission amounts of the light emitting elements of the three colors of R, G and B for emitting the strobe light corresponding to each color temperature, for each color temperature at predetermined intervals; and a color temperature adjustment device which reads a corresponding ratio of the light emission amounts of R, G and B from the storage device depending on the color temperature at which the light emission should be performed, and adjusts the color temperature of the strobe light by controlling the respective light emission amounts of the light emitting elements of the three colors so that the respective light emission amounts of the light emitting elements of the three colors have the read ratio of the light emission amounts of R, G and B. Moreover, the storage device stores the ratio of the light emission amounts of R, G and B with the predetermined intervals varied according to the color temperature.

Thereby, the memory can be efficiently used.

According to a tenth aspect of the present invention, in the strobe device according to the ninth aspect, the light emitting elements are light emitting diodes.

According to an eleventh aspect of the present invention, in the strobe device according to the ninth aspect, the storage device stores the ratio of the light emission amounts of R, G and B, with the predetermined intervals narrowed in a range of the color temperature in which the ratio of the light emission amounts of R, G and B widely varies with respect to variation in the color temperature, and with the predetermined intervals widened in a range of the color temperature in which the ratio of the light emission amounts of R, G and B insignificantly varies with respect to the variation in the color temperature.

According to a twelfth aspect of the present invention, the strobe device according to the ninth aspect further includes a color temperature detection device which detects a color temperature of a subject field. And the color temperature adjustment device reads, from the storage device, a ratio of the light emission amounts of R, G and B corresponding to a color temperature closest to the color temperature detected by the color temperature detection device, or a color temperature closest to the color temperature detected by the color temperature detection device on a low temperature side, or a color temperature closest to the color temperature detected by the color temperature detection device on a high temperature side, and adjusts the color temperature of the strobe light by controlling the respective light emission amounts of the light emitting elements of the three colors to match the read ratio of the light emission amounts of R, G and B.

According to a thirteenth aspect of the present invention, the strobe device according to the ninth aspect further includes a color temperature detection device which detects a color temperature of a subject field. And the color temperature adjustment device reads ratios of the light emission amounts of R, G and B corresponding to a color temperature closest to the color temperature detected by the color temperature detection device on a low temperature side and a color temperature closest to the color temperature detected by the color temperature detection device on a high temperature side, respectively from the storage device, calculates a ratio of the light emission amounts of R, G and B by interpolating the read ratios of the light emission amounts of R, G and B with the detected color temperature, and adjusts the color temperature of the strobe light by controlling the respective light emission amounts of the light emitting elements of the three colors to match the calculated ratio of the light emission amounts of R, G and B.

In order to achieve the above described object, according to a fourteenth aspect of the present invention, a camera which shoots a subject and records image data of the shot subject, comprises: a strobe light source which emits strobe light whose color temperature is adjustable, and is configured with light emitting elements of three colors of R, G and B whose respective light emission amounts can be independently controlled; a light emission control device which controls the strobe light source to emit the strobe light in synchronization with shooting; a storage device which stores ratios of the light emission amounts of the light emitting elements of the three colors of R, G and B for emitting the strobe light corresponding to each color temperature, for each color temperature at predetermined intervals; and a color temperature adjustment device which reads a corresponding ratio of the light emission amounts of R, G and B from the storage device depending on the color temperature at which the light emission should be performed, and adjusts the color temperature of the strobe light by controlling the respective light emission amounts of the light emitting elements of the three colors so that the respective light emission amounts of the light emitting elements of the three colors have the read ratio of the light emission amounts of R, G and B. Moreover, the storage device stores the ratio of the light emission amounts of R, G and B with the predetermined intervals varied according to the color temperature.

Thereby, the memory can be efficiently used.

According to a fifteenth aspect of the present invention, in the camera according to the fourteenth, the light emitting elements are light emitting diodes.

According to a sixteenth aspect of the present invention, in the camera according to the fourteenth aspect, the storage device stores the ratio of the light emission amounts of R, G and B, with the predetermined intervals narrowed in a range of the color temperature in which the ratio of the light emission amounts of R, G and B widely varies with respect to variation in the color temperature, and with the predetermined intervals widened in a range of the color temperature in which the ratio of the light emission amounts of R, G and B insignificantly varies with respect to the variation in the color temperature.

According to a seventeenth aspect of the present invention, the camera according to the fourteenth aspect further includes a color temperature detection device which detects a color temperature of a subject field. And the color temperature adjustment device reads, from the storage device, a ratio of the light emission amounts of R, G and B corresponding to a color temperature closest to the color temperature detected by the color temperature detection device, or a color temperature closest to the color temperature detected by the color temperature detection device on a low temperature side, or a color temperature closest to the color temperature detected by the color temperature detection device on a high temperature side, and adjusts the color temperature of the strobe light by controlling the respective light emission amounts of the light emitting elements of the three colors to match the read ratio of the light emission amounts of R, G and B.

According to an eighteenth aspect of the present invention, the camera according to the fourteenth aspect further includes a color temperature detection device which detects a color temperature of a subject field. And the color temperature adjustment device reads ratios of the light emission amounts of R, G and B corresponding to a color temperature closest to the color temperature detected by the color temperature detection device on a low temperature side and a color temperature closest to the color temperature detected by the color temperature detection device on a high temperature side, respectively from the storage device, calculates a ratio of the light emission amounts of R, G and B by interpolating the read ratios of the light emission amounts of R, G and B with the detected color temperature, and adjusts the color temperature of the strobe light by controlling the respective light emission amounts of the light emitting elements of the three colors to match the calculated ratio of the light emission amounts of R, G and B.

According to the present invention, even in a situation where the strobe light emission at a right color temperature is difficult, it is possible to perform the shooting with the strobe light emission at the color temperature intended by the shooter because in a color bracketing shooting, shootings are performed in conjunction with continuously emitting the strobe light at the different color temperature. Furthermore, it is possible to provide the strobe device and the camera which can minimize required data of the ratio of the light emission amounts of R, G and B for varying a color temperature of an emitted light color of a strobe in which the light emitting elements of R, G and B are used, and can utilize the memory efficiently.

BRIEF DESCRIPTION OF THE DRAWINGS

FIG. 4 is a block diagram showing an internal configuration of the camera shown in FIG. 1;

FIG. 5 is a block diagram showing details of a strobe device built in or externally attached to the camera shown in FIG. 1;

FIG. 13 is a graph representing a relationship between a color temperature and a ratio of three primary colors RGB;

DETAILED DESCRIPTION OF THE PREFERRED EMBODIMENTS

Preferred embodiments of a strobe device and a camera according to embodiments of the present invention will be described below according to the accompanying drawings.

First Embodiment

Figure 1:
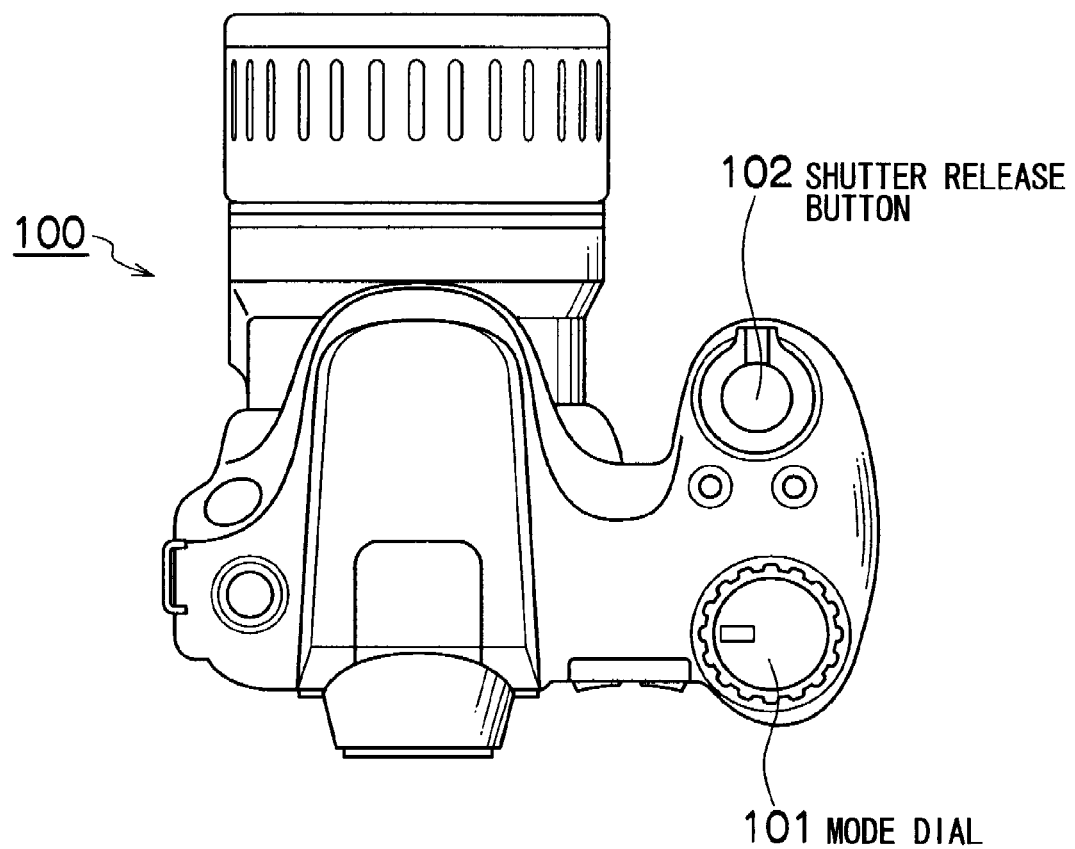
FIG. 1 is a top view of a camera according to an embodiment of the present invention.

FIG. 1 is a top view of an electronic camera capable of color bracketing shooting according to an embodiment of the present invention.

As shown in FIG. 1, a mode dial 101 can be rotated to set to any shooting mode among a manual shooting mode, an auto shooting mode, a person mode and the like. Moreover, in front of the mode dial 101, a shutter release button 102 having a switch S1 to be turned on for half-pressing the button and a switch S2 to be turned on for fully pressing the button are provided.

Figure 2:
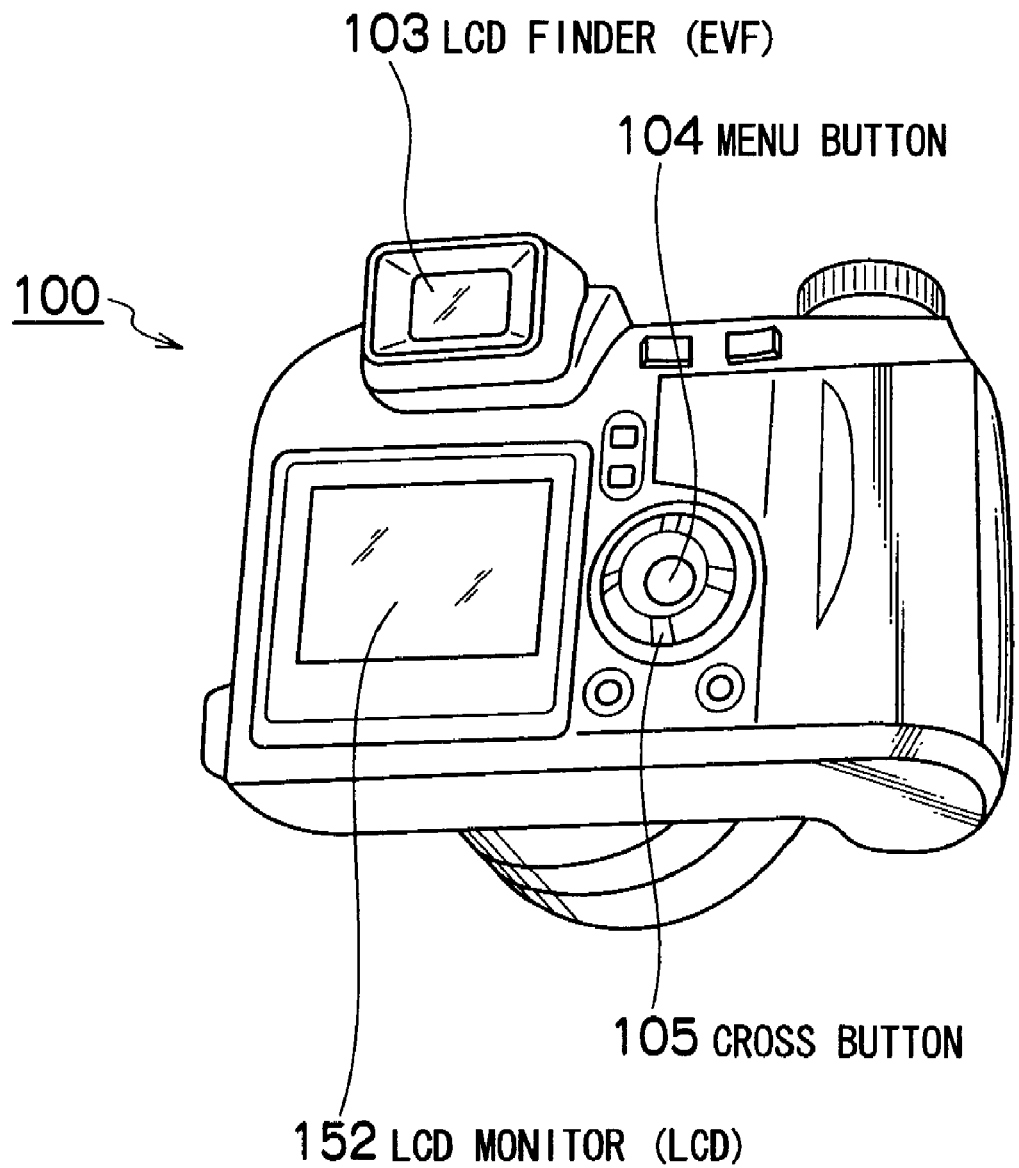
FIG. 2 is a rear perspective view of the camera according to the embodiment of the present invention.

FIG. 2 is a rear perspective view of the electronic camera capable of the color bracketing shooting according to the embodiment of the present invention.

On a rear side of this electronic camera 100, as shown in FIG. 2, an LCD finder 103, a menu button 104, a cross button 105 and an LCD monitor 152 are provided.

Figure 3:
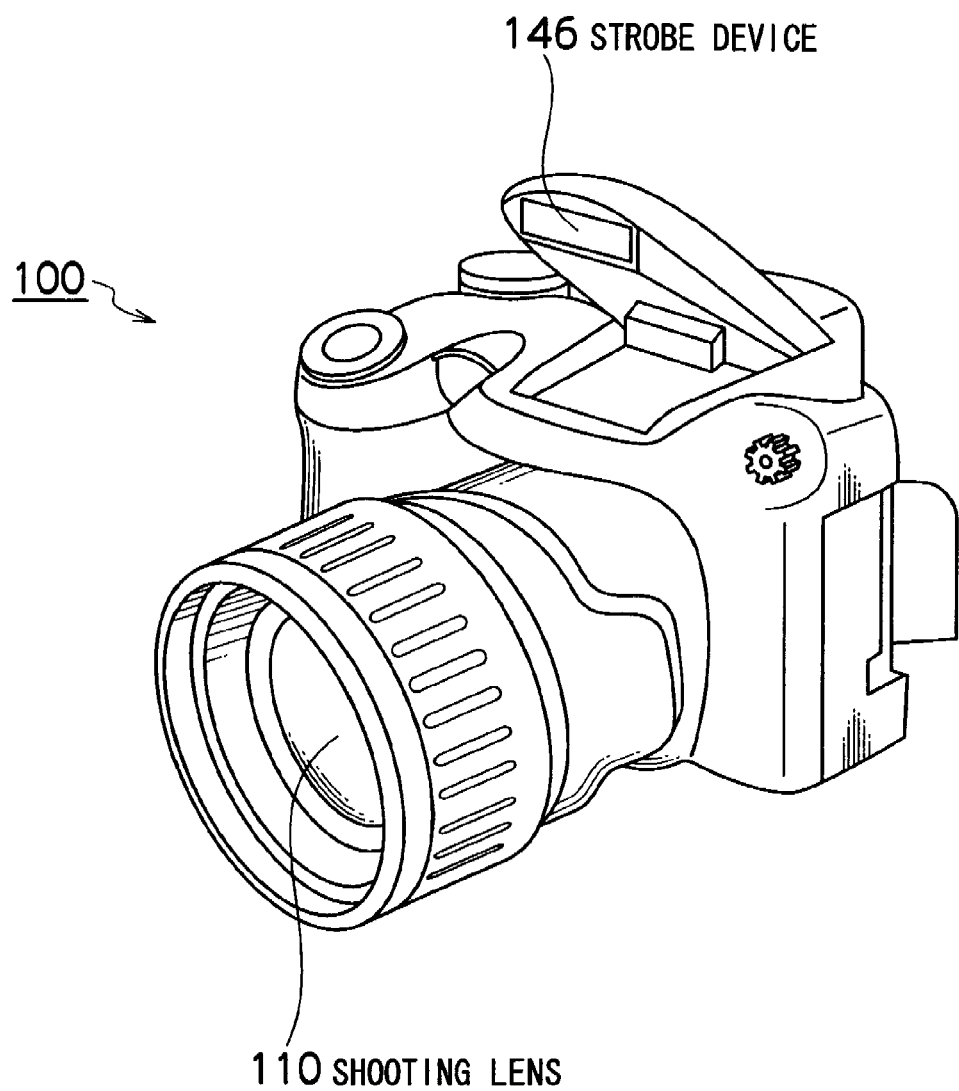
FIG. 3 is a front perspective view of the camera according to the embodiment of the present invention.

FIG. 3 is a front perspective view of the electronic camera capable of the color bracketing shooting according to the embodiment of the present invention.

On a front side of this electronic camera 100, as shown in FIG. 3, a shooting lens 110 and a strobe device 146 are provided.

FIG. 4 is a block diagram showing an internal configuration of the electronic camera 100 shown in FIG. 1.

In FIG. 4, a subject image imaged on a light receiving surface of a solid-state image pickup element (CCD) 114 via the shooting lens 110 and an aperture 112 is converted into a signal charge of an amount depending on an incident light amount of light at each sensor. The signal charge stored in this way is read out to a shift register with a read gate pulse applied from a CCD driving circuit 116, and sequentially read out as a voltage signal depending on the signal charge with a register transfer pulse. It should be noted that this CCD 114 has a so-called electronic shutter function in which the stored signal charge can be flushed with a shutter gate pulse and thereby a charge storage time (shutter speed) is controlled.

The voltage signal sequentially read from the CCD 114 is applied to a correlated double sampling circuit (CDS circuit) 118, in which R, G and B signals for each pixel are sampling-held and applied to an A/D converter 120. The A/D converter 120 converts the R, G and B signals which are sequentially applied from the CDS circuit 118, into digital R, G and B signals and outputs the digital R, G and B signals. In addition, the CCD driving circuit 116, the CDS circuit 118 and the A/D converter 120 are synchronously driven with a timing signal applied from a timing generation circuit 122.

The R, G and B signals outputted from the above described A/D converter 120 are temporarily stored in a memory 124, and subsequently, the R, G and B signals stored in the memory 124 are applied to a digital signal processing circuit 126. The digital signal processing circuit 126 is configured with a synchronization circuit 128, a white balance adjustment circuit 130, a gamma correction circuit 132, a YC signal generation circuit 134, a memory 136 and the like.

The synchronization circuit 128 converts dot sequential R, G and B signals read from the memory 124 into simultaneous signals, and outputs the R, G and B signals simultaneously to the white balance adjustment circuit 130. The white balance adjustment circuit 130 is configured with multipliers 130R, 130G and 130B which increase and decrease digital values of the R, G and B signals respectively, and the R, G and B signals are applied to the multipliers 130R, 130G and 130B respectively. At another input of each of the multipliers 130R, 130G and 130B, a white balance correction value (gain value) for controlling white balance is added from a central processing unit (CPU) 138. Each of the multipliers 130R, 130G and 130B multiplies two inputs, and outputs R', G' and B' signals subjected to white balance adjustment based on this multiplication to the gamma correction circuit 132. In addition, the white balance correction value added from the CPU 138 to the white balance adjustment circuit 130 will be described in detail later.

The gamma correction circuit 132 changes input/output characteristics so that the R', G' and B' signals subjected to the white balance adjustment have desired gamma characteristics, and outputs the R', G' and B' signals to the YC signal generation circuit 134. The YC signal generation circuit 134 generates a luminance signal Y and chroma signals Cr and Cb from the R', G' and B' signals subjected to gamma correction. These luminance signal Y and chroma signals Cr and Cb (YC signals) are stored in the memory 136 located in the same memory space as the memory 124.

Here, when the YC signals in the memory 136 are read and outputted to the LCD monitor 152, pass-through images (live-view images), shot still images or the like can be displayed on the LCD monitor 152.

Moreover, the YC signals after the shooting are compressed in a predetermined format by a compression/expansion circuit 154, and subsequently recorded in a recording medium such as a memory card by a recording section 156. Furthermore, in a replaying mode, image data recorded in the memory card or the like is subjected to an expansion process by the compression/expansion circuit 154 and subsequently outputted to the LCD monitor 152, and a replayed image is displayed on the LCD monitor 152.

The CPU 138 controls the respective circuits in an integrated manner based on input from a camera operation section 140 including the mode dial 101, the shutter release button 102, the menu button 104, the cross button 105 and the like shown in FIGS. 1 and 2, and also controls auto focus, auto exposure control, the white balance and the like. This auto focus control is, for example, a contrast AF which moves the shooting lens 110 so that a high frequency component of the G signal becomes maximum, and the shooting lens 110 is moved to a focus position via a driving section 142 so that the high frequency component of the G signal becomes maximum when the shutter release button 102 is half-pressed.

Moreover, in the auto exposure control, the R, G and B signals are captured, luminance of a subject (shooting EV value) is obtained based on an integrated value obtained by integrating these R, G and B signals, and based on this shooting EV value, an aperture value and the shutter speed at the time of shooting are determined. Next, when the shutter release button 102 is fully pressed, the aperture 112 is driven via an aperture driving section 144 so that the aperture value becomes the above described determined aperture value, and also the charge storage time is controlled by the electronic shutter so that the shutter speed becomes the determined shutter speed, and then one frame of the image data is captured, subjected to required signal processing and subsequently recorded in the recording medium.

Next, a white balance correction method will be described.

Figure 7:
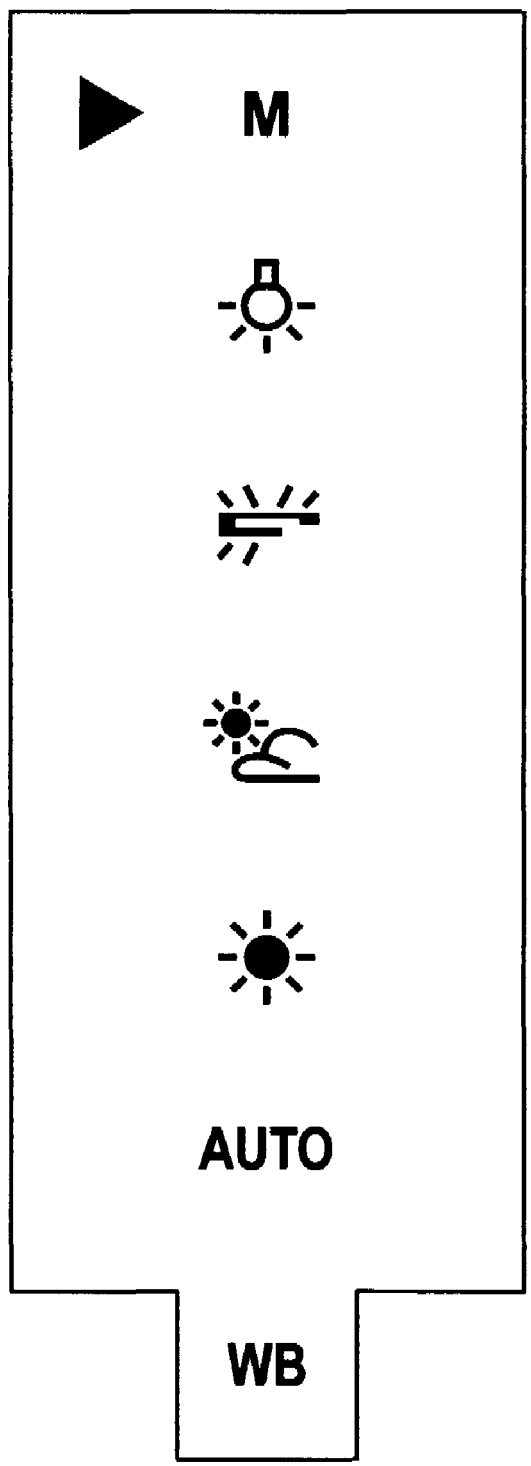
FIG. 7 is a view showing an LCD display screen of the camera shown in FIG. 1.

Although white balance correction is also performed in the auto shooting mode, if the white balance correction is manually performed, the manual shooting mode is set with the mode dial 101, and furthermore, the menu button 104 is operated to display a menu for setting the white balance on the LCD monitor 152 as shown in FIG. 7. Here, a cursor is moved up and down with the cross button 105 to select an item for the white balance correction (M, icons showing light source types or AUTO).

Here, a method of measuring a color temperature of a subject field (light source type) measured in the case of the auto shooting mode or the case of setting the white balance to "AUTO" will be described.

One screen is split into multiple areas (8×8), and for each split area, an average integrated value for each color of the R, G and B signals is obtained from the R, G and B signals which have been temporarily stored in the memory 124 shown in FIG. 4. These average integrated values of the R, G and B signals for each split area are calculated by an integration circuit 148 and added to the CPU 138. Multipliers 150R, 150G and 150B are provided between the integration circuit 148 and the CPU 138, and an adjustment gain value for adjusting variation in equipment is added to the multipliers 150R, 150G and 150B.

Based on the above described average integrated values of the R, G and B signals for each split area, the CPU 138 determines the light source type such as daylight (fine), shaded area-cloudy, fluorescent light, tungsten bulb and the like. In this light source type determination, ratios of the average integrated values for each color of the R, G and B signals, R/G and B/G, are obtained for the above described each split area, and subsequently, a detection frame showing a range of color distribution corresponding to each light source type is set on a graph having a horizontal axis of R/G and a vertical axis of B/G. Next, based on the above described obtained ratios R/G and B/G for each area, the number of areas to be put in the above described detection frame is obtained, and the color source type is determined based on a luminance level of the subject and the number of the areas to be put in the detection frame (see Japanese Patent Application Laid-Open No. 2000-224608). In addition, a method of automatically obtaining the light source type (the color temperature of the subject field) is not limited to this embodiment, and the color temperature may be obtained by calculating the color temperature based on a ratio of luminance information on the R, G and B signals obtained from the CCD 114, and the like.

When the light source type (the color temperature of the subject field) is obtained as described above, the CPU 138 determines the white balance correction value suitable for the light source type, and outputs the determined white balance correction value (gain value) to the multipliers 130R, 130G and 130B. Thereby, the multipliers 130R, 130G and 130B output the R', G' and B' signals subjected to white balance adjustment, to the gamma correction circuit 132.

Here, if the white balance has been set to "M", the color temperature which has been previously stored based on an operation of storing the color temperature is read out, the white balance correction value is determined depending on the color temperature, and the white balance correction is performed similarly.

Moreover, if the white balance has been set to the icon showing the light source type, the white balance correction value suitable for the selected light source type is determined and the white balance correction is performed.

In addition, although a white balance process is performed in the digital signal processing circuit 126 in this embodiment, the white balance process may be performed in an analog signal processing circuit including the CDS circuit 118, a gain control amplifier which is not shown in the figure and the like. Moreover, although the white balance process is performed by varying the ratios of R/G and B/G based on an independent gain process for each of R, B and G, there is also a method of performing the white balance process by adding or subtracting one value with respect to color difference signals $C_r$ and $C_b$ by an independent addition/subtraction process for each of the color difference signals $C_r$ and $C_b$.

Next, a method of controlling the strobe device 146 according to the present invention will be described.

FIG. 5 is a block diagram showing details of the strobe device 146 built in or externally attached to the above described electronic camera 100.

As shown in FIG. 5, in this strobe device 146, a light receiving sensor for strobe light control 34, an LED group 38, a battery 40, a voltage up-converter 42, a high capacity condenser 44, operational amplifiers 46, 48 and 50, a system controller 52, a light control circuit 54 and a temperature sensor 56 are provided.

The system controller 52 controls the strobe device 146 in an integrated manner, and a light emission signal synchronized with the shutter release is inputted from the CPU 138, or strobe light emission amount information or strobe color temperature information is inputted from the CPU 138 via serial communication. The system controller 52 controls the voltage up-converter 42 to increase voltage (for example, 6 V) of the battery 40 to approximately 10 V, and charges the condenser 44 with this increased voltage. In addition, the condenser 44 is charged, for example, in a long time such as 2 to 5 seconds, and also can continuously supply current to the LED group 38 for more than or equal to 1/60 seconds (approximately 16 milliseconds).

Electric energy accumulated in this condenser 44 is supplied to LEDs of R, G and B 38R, 38G and 38B via the operational amplifiers 46, 48 and 50. The system controller 52 controls the above described operational amplifiers 46, 48 and 50 based on the strobe light emission amount information or the strobe color temperature information from the CPU 138 to control a light emission time and a light emission amount of each of the LEDs of R, G and B 38R, 38G and 38B.

In addition, since the light amount of the LED varies depending on an ambient temperature, the temperature sensor 56 which detects the ambient temperature of the LED group 38 is provided, and based on the ambient temperature of the LED group 38 detected by this temperature sensor 56, the system controller 52 controls the current with respect to the LED group 38 so that a required light emission amount can be obtained regardless of the ambient temperature.

Next, operations of the above described system controller 52 will be described with reference to timing charts shown in FIGS. 6A, 6B, 6C and 6D.

The system controller 52 previously operates the voltage up-converter 42 at a timing of turning on the camera which is not shown in the figure, and charges the condenser 44.

Subsequently, when the shutter release button 102 is half-pressed, a standby state occurs (FIG. 6A) and information for determining a strobe light emission amount such as a guide number is captured.

Here, if the item for the white balance correction is "M", the CPU 138 reads the color temperature which has been previously stored, or in the case of the auto shooting mode or the case where the item for the white balance correction is "AUTO", the CPU 138 automatically obtains the light source type (the color temperature of the subject field) based on the R, G and B signals obtained from the CCD 114, and sets the color temperature for the white balance correction.

Figure 6A:
FIGS. 6A, 6B, 6C and 6D are timing charts showing operations of the camera shown in FIG. 1.
Figure 6B:

The CPU 138 has outputted this above described color temperature for the white balance correction, and the system controller 52 captures the color temperature outputted from the CPU 138 (FIG. 6B).

Figure 6C:
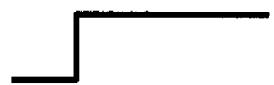

The system controller 52 determines the strobe light emission amount based on the above described captured information and outputs a reference value for adjusting the light emission amount in order to obtain the strobe light emission amount, to the light control circuit 54, and also, determines a ratio of the light emission amounts of the LEDs of R, G and B 38R, 38G and 38B so that the light of the same color temperature is emitted based on the color temperature of the subject field, and sets R, G and B light emission levels corresponding to this ratio (FIG. 6C).

Next, when the shutter release button 102 is fully pressed and a shutter opens, the system controller 52 inputs the light emission signal synchronized with the opening of the shutter, and outputs control signals showing the above described set R, G and B light emission levels to positive inputs of the operational amplifiers 46, 48 and 50, respectively. On the other hand, signals corresponding to values of the current flowing through the respective LEDs 38R, 38G and 38B are applied to negative inputs of the operational amplifiers 46, 48 and 50, and the operational amplifiers 46, 48 and 50 control constant current corresponding to the above described set R, G and B light emission levels to flow through the respective LEDs 38R, 38G and 38B.

Figure 6D:

Thereby, strobe light of the color temperature which is the same as the color temperature of the subject field as a whole is emitted from the LED group 38 (FIG. 6D).

When the strobe light is emitted from the LED group 38, the light control circuit 54 senses the light emission amount via the light receiving sensor for the strobe light control 34. If this sensed light emission amount matches the reference value for adjusting the light emission amount, the light control circuit 54 outputs a light emission stop signal to the system controller 52 in order to stop the light emission. When the light emission stop signal is inputted from the light control circuit 54, the system controller 52 outputs a control signal for stopping the light emission of the LED group 38 to the operational amplifiers 46, 48 and 50. Thereby, the current flowing into the LED group 38 is broken and the light emission of the LED group 38 is stopped.

Next, a method of controlling the color bracketing shooting according to the present invention will be described by using FIGS. 8, 9 and 10.

Figure 8:
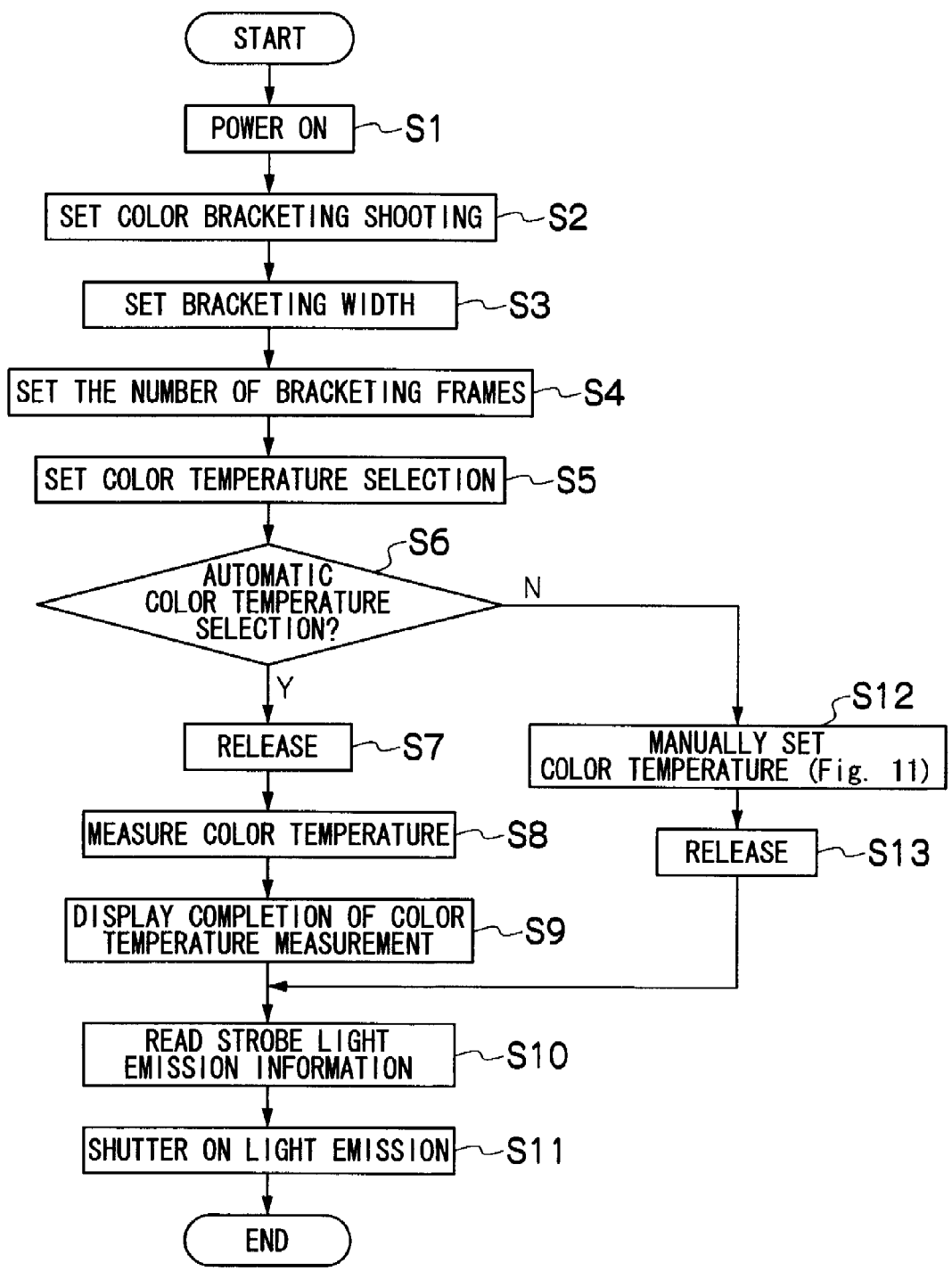
FIG. 8 is a flowchart showing the operations of the camera shown in FIG. 1.
Figure 9:
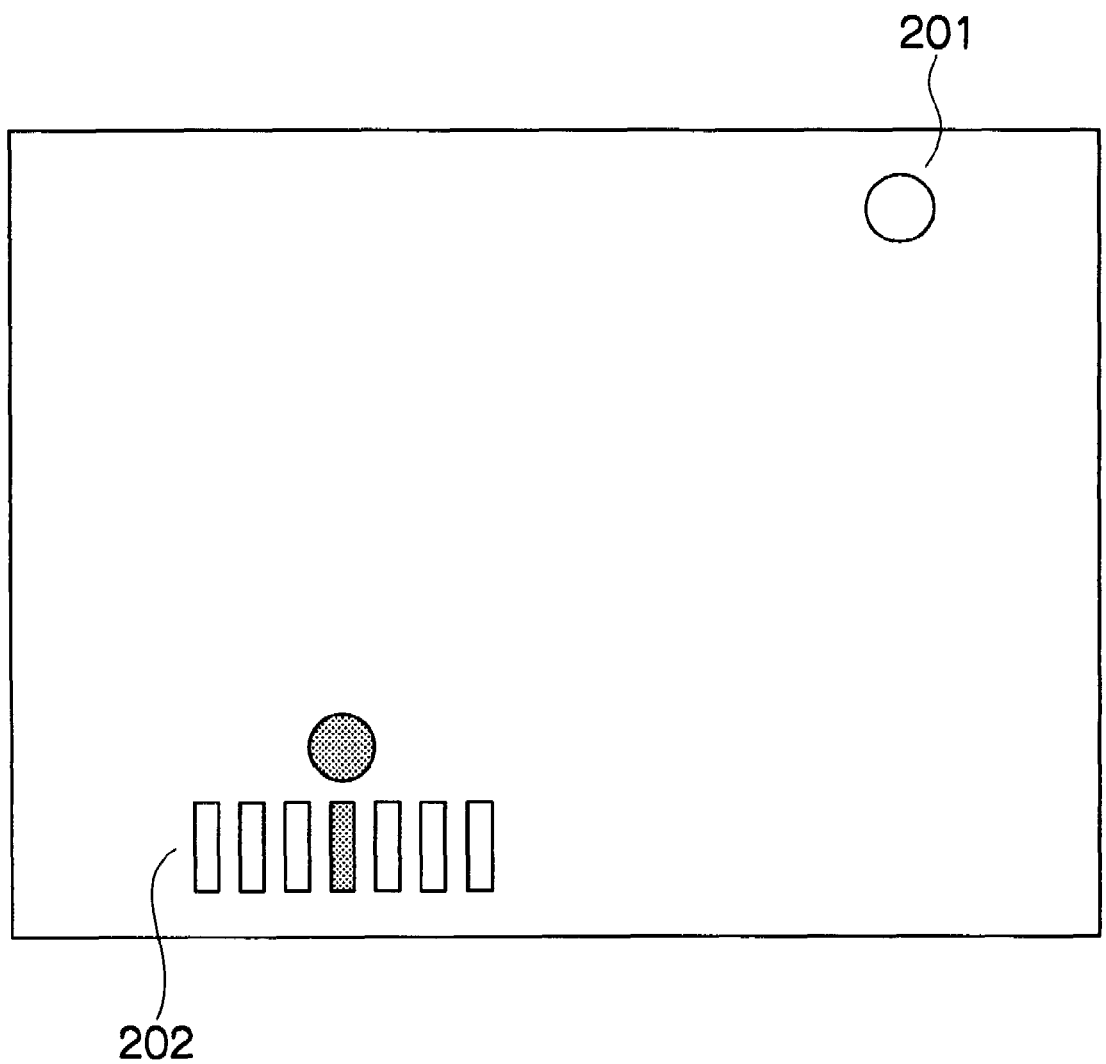
FIG. 9 is a view showing a display in a finder of the camera shown in FIG. 1.
Figure 10:
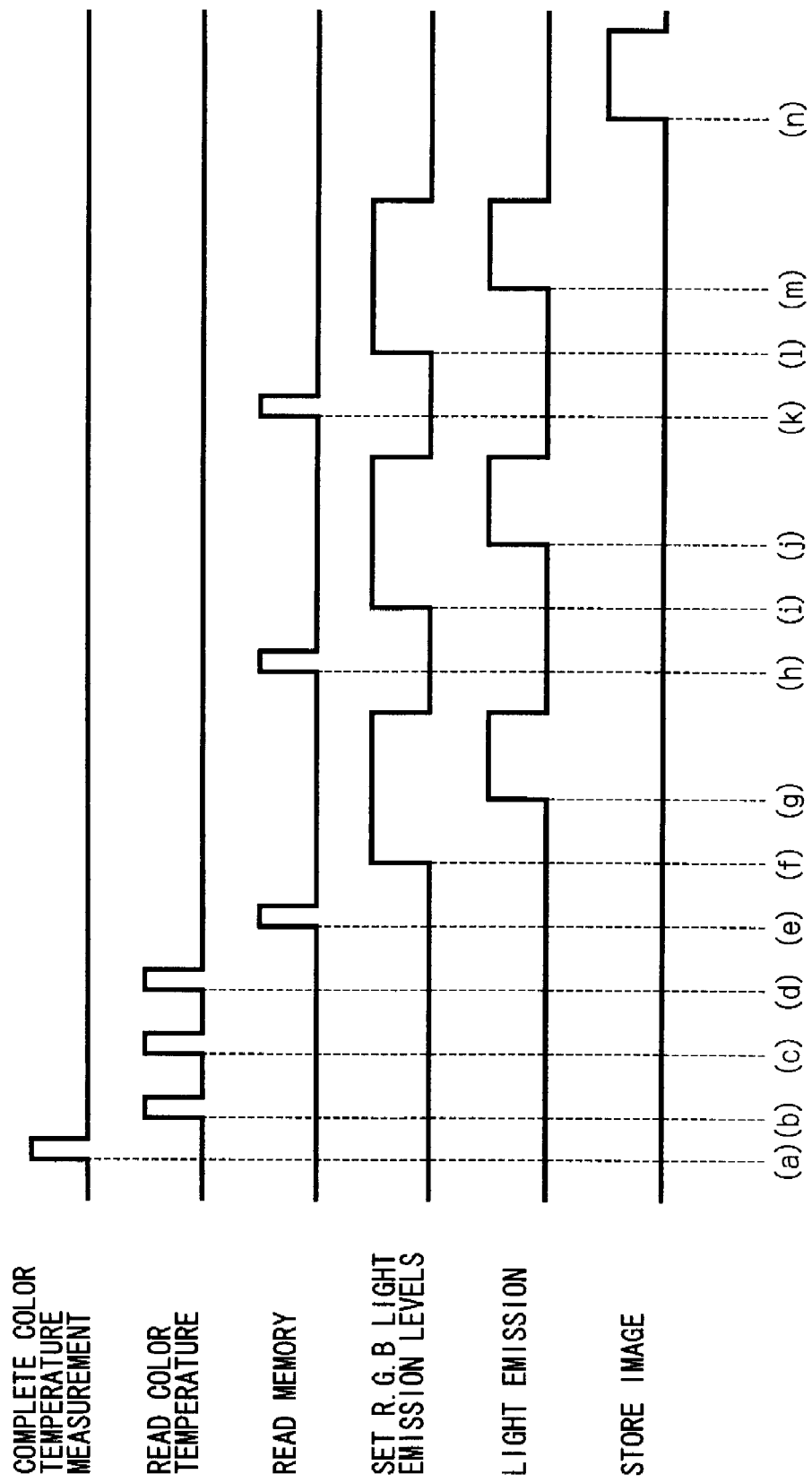
FIG. 10 is a timing chart showing the operations of the camera shown in FIG. 1.

FIG. 8 is a flowchart showing operations of the camera at the time of the color bracketing shooting, FIG. 9 is a view representing a display inside the finder 103 at the time of the color bracketing shooting, and FIG. 10 is a timing chart showing the operations of the system controller 52 at the time of the color bracketing shooting.

First, a case of setting a color temperature selection for color bracketing to automatic selection "AUTO" will be described.

When a shooter turns on the camera, the system controller 52 previously operates the voltage up-converter 42 and charges the condenser 44 (S1 in FIG. 8).

Next, the shooter uses the mode dial 101, the menu button 104 and the cross button 105 of the camera 100 to perform mode setting for performing the color bracketing shooting such as shooting mode selection or strobe shooting selection (S2 in FIG. 8).

When the color bracketing shooting is selected, next, a bracketing width showing how many steps plus or minus of bracketing are performed is selected (S3 in FIG. 8).

Although the steps will be described later, here, it is assumed that plus or minus one step has been selected.

Next, the number of bracketing frames showing how many frames of the bracketing are performed is selected (S4 in FIG. 8). Here, it is assumed that three frames have been selected.

When the selection of the bracketing width and the selection of the number of the bracketing frames are completed, the color temperature selection is set next (S5 in FIG. 8).

The color temperature selection includes two kinds of the automatic selection "AUTO" and manual selection "M", and here, the color temperature selection is set to the automatic selection "AUTO".

When "AUTO" is set, an operation of the shutter release button 102 is waited for (S6 in FIG. 8).

Here, when the shutter release button 102 is half-pressed (S7 in FIG. 8), the CPU 138 obtains the light source type (the color temperature of the subject field) similarly to the case of the white balance correction (S8 in FIG. 8), determines a white balance correction value (first correction value) suitable for the obtained color temperature of the subject field (first color temperature), and also determines a white balance correction value (second correction value) suitable for a color temperature which is lower than the above described obtained color temperature of the subject field by one step (second color temperature) and a white balance correction value (third correction value) suitable for a color temperature which is higher than the above described obtained color temperature of the subject field by one step (third color temperature).

When the measurement of the color temperature of the subject field is completed, a color temperature measurement completion display lamp 201 is turned on, on the display within the finder 103 shown in FIG. 9 (S9 in FIG. 8).

Next, strobe light emission information is read (S10 in FIG. 8), and subsequently, when the shutter release button 102 is fully pressed, strobe shooting for the three frames is performed at predetermined intervals (S11 in FIG. 8). The details thereof will be described by using the timing chart of FIG. 10.

When the measurement of the color temperature is completed (timing (a) in FIG. 10), the CPU 138 outputs the first color temperature (timing (b) in FIG. 10), the second color temperature (timing (c) in FIG. 10) and the third color temperature (timing (d) in FIG. 10) along with the light emission amount information.

This information is inputted to the system controller 52, and the system controller 52 determines the strobe light emission amount based on the above described captured light emission amount information, and outputs the reference value for adjusting the light emission amount in order to obtain the strobe light emission amount, to the light control circuit 54.

Moreover, RGB ratio data with respect to the color temperature has been stored in a memory 25. First, the system controller 52 reads an RGB ratio corresponding to first color temperature information from the memory 25 (timing (e) in FIG. 10), and sets the R, G and B light emission levels of the LEDs 38R, 38G and 38B so that the strobe light is emitted at the read RGB ratio (timing (f) in FIG. 10).

Subsequently, when the shutter release button 102 is fully pressed, the shooting with the strobe light emission with the light emission amount and an emitted light color based on the set information, that is, the strobe light emission shooting at the first color temperature is performed (timing (g) in FIG. 10).

As described above, image data of a first frame obtained by performing the shooting in this way is outputted via the correlated double sampling circuit (CDS circuit) 118 from the A/D converter 120, and temporarily stored in the memory 124. In normal shooting, subsequently, digital signal processing is performed in the digital signal processing circuit 126. However, in the case of the color bracketing shooting mode, since the shooting is prioritized, the digital signal processing is performed in the digital signal processing circuit 126 after the image data of the shooting of all of the number of the bracketing frames (here, the three frames) has been inputted to the memory 124.

When the shooting of the first frame is completed, the system controller 52 immediately reads an RGB ratio corresponding to second color temperature information from the memory 25 (timing (h) in FIG. 10), and sets the R, G and B light emission levels of the LEDs 38R, 38G and 38B so that the strobe light is emitted at the read RGB ratio (timing (i) in FIG. 10).

When the setting of the light emission levels is completed, the strobe light emission shooting at the second color temperature is performed (timing (j) in FIG. 10).

When the shooting of the second frame is completed, the system controller 52 immediately reads an RGB ratio corresponding to third color temperature information from the memory 25 (timing (k) in FIG. 10), and sets the R, G and B light emission levels of the LEDs 38R, 38G and 38B so that the strobe light is emitted at the read RGB ratio (timing (l) in FIG. 10).

When the setting of the light emission levels is completed, the strobe light emission shooting at the third color temperature is performed (timing (m) in FIG. 10).

When the shooting of the third frame is completed, shooting data for the three frames stored in the memory 124 is applied with desired digital processing by the digital signal processing circuit 126. Here, the shooting data of the first, second and third frames is subjected to the white balance correction with the first, second and third correction values, respectively. Subsequently, the shooting data for the three frames is recorded in the recording medium by the recording section 156 (timing (n) in FIG. 10).

As described above, if the color temperature selection for the color bracketing shooting is set to the automatic selection "AUTO", the color bracketing shooting is realized in which the shooting is continuously performed so that the first frame is shot with the strobe light emission at the first color temperature, the second frame is shot with the strobe light emission at the second color temperature, and the third frame is shot with the strobe light emission at the third color temperature.

In addition, although the color temperature information for the shooting of the three frames has been previously inputted to the system controller 52 in this embodiment, the color temperature information may be inputted for the shooting of each frame. Moreover, in this embodiment, although the strobe light emission is performed in an order of the color temperature of the subject field, the color temperature lower than the color temperature of the subject field, and the color temperature higher than the color temperature of the subject field, this order may be different.

Moreover, in this embodiment, although a different value is also used for the white balance correction value for each shooting, a white balance value may be constant and only the color temperature of the strobe may be different. Moreover, although the shot image data is collectively recorded in the recording medium after the shooting of all frames has been completed, the shot image data may be recorded one by one for each shooting. Moreover, the number of times of the bracketing shooting is not limited to three and may be any number of times.

Next, a case of setting the color temperature selection for the color bracketing to the manual selection "M" will be described.

As shown in FIG. 7, in the setting of "M", a user can set a center of the color temperature for the color bracketing.

In FIG. 8, since the operations from S1 to S4 are similar to the case of "AUTO", descriptions thereof are omitted. However, it is assumed that plus or minus one step has been selected as a bracketing correction width and three frames have been selected as the number of the bracketing frames.

In the setting of the color temperature selection, the color temperature selection is set to "M" at this time (S5 in FIG. 8).

When the color temperature selection is set to "M", the process proceeds to a step of manually setting the color temperature (S6 in FIG. 8).

After the manual setting of the color temperature (S12 in FIG. 8) is completed, when the shutter release button 102 is half-pressed (S13 in FIG. 8), the strobe light emission information based on the manually set color temperature information is read (S10 in FIG. 8), and subsequently, when the shutter release button 102 is fully pressed, the strobe shooting for the three frames is performed at the predetermined intervals (S11 in FIG. 8).

Here, the manual setting of the color temperature will be described by using FIG. 11.

Figure 11:
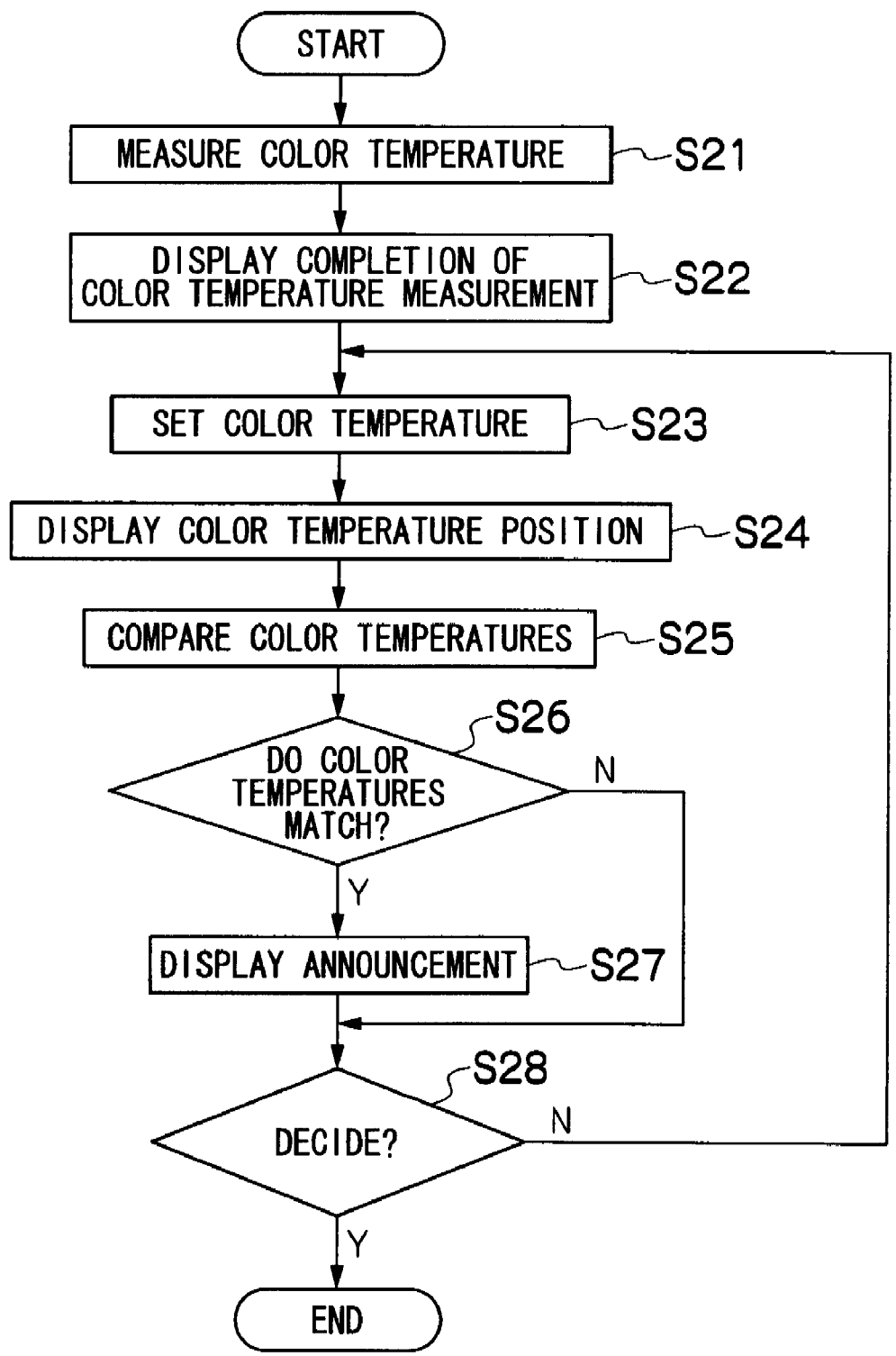
FIG. 11 is a flowchart showing the operations of the camera shown in FIG. 1.

FIG. 11 is a detailed flowchart of the manual setting of the color temperature shown in S12 in FIG. 8.

When the color temperature selection is set to "M", the CPU 138 measures the color temperature of the subject field (S21 in FIG. 11). When the measurement of the color temperature is completed, the color temperature measurement completion display lamp 201 is turned on and also a color temperature set value mark 202 shown in FIG. 9 is displayed within the LCD finder 103 (S22 in FIG. 11).

Here, the color temperature set value mark 202 will be described by using FIGS. 12A, 12B and 12C.

Figure 12A:
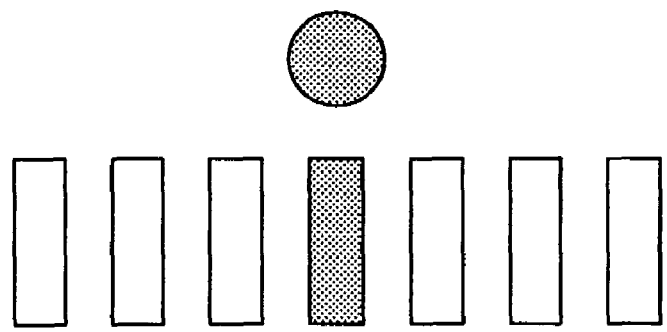
FIGS. 12A, 12B and 12C are enlarged views of the display in the finder of the camera shown in FIG. 1.
Figure 12B:
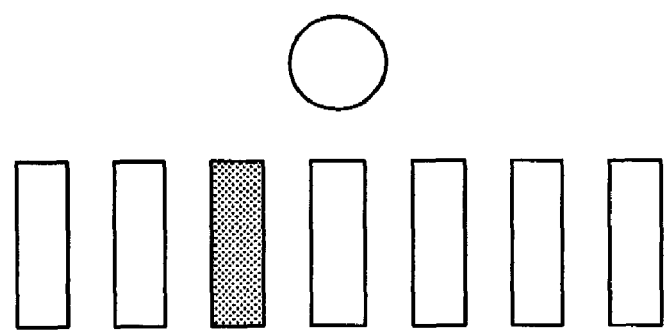
Figure 12C:
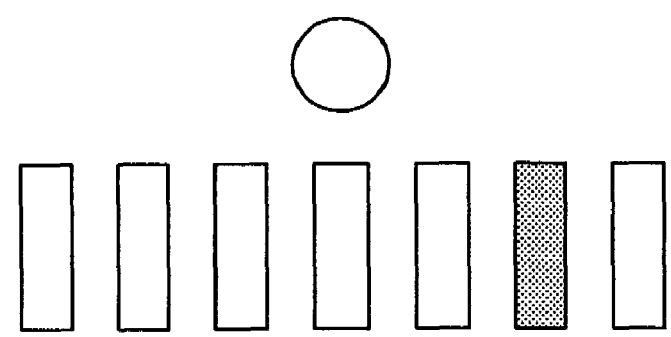

FIGS. 12A, 12B and 12C are enlarged views of the color temperature set value mark 202 of FIG. 9, in which seven rectangles are laterally aligned and one of the rectangles is displayed in black.

A central rectangle, that is, a rectangle under a circle mark shows a current color temperature of the subject field, the rectangles show color temperatures which can be set, and the rectangle displayed in black shows the color temperature which is currently set.

Moreover, when the rectangle displayed in black is set to a middle position (under the circle mark), display of the circle mark is changed from white to black for showing that the subject field has matched the set color temperature.

In other words, FIG. 12A represents that the center of the color temperature for the color bracketing has been set to the color temperature of the subject field, FIG. 12B represents that the center of the color temperature for the color bracketing has been set to the color temperature which is lower than the color temperature of the subject field by one step, and FIG. 12C represents that the center of the color temperature for the color bracketing has been set to the color temperature which is higher than the color temperature of the subject field by two steps.

When the setting of color temperature is changed by using the camera operation section 140 (S23 in FIG. 11), a position of the rectangle displayed in black is changed (S24 in FIG. 11), and the user can set a desired color temperature while seeing this position.

Moreover, the CPU 138 compares the set color temperature with the color temperature of the subject field (S25 in FIG. 11), and when the set color temperature matches the color temperature of the subject field, that is, when the rectangle displayed in black is set to the middle position, displays the circle mark which has been previously displayed in white, in black, and displays an announcement that the set color temperature has matched the color temperature of the subject field (S26 and S27 in FIG. 11).

In this way, the user can freely set the center of the color temperature for the color bracketing in a range of plus or minus by three steps with respect to the color temperature of the subject field, while seeing the color temperature set value mark 202, by using the camera operation section 140.

Here, if the shutter release button 102 is half-pressed in a state of setting as shown in FIG. 12C (S12 in FIG. 8), the CPU 138 determines a white balance correction value (first correction value) suitable for the color temperature higher than the color temperature of the subject field, which has been already measured, by two steps (first color temperature), and also determines a white balance correction value (second correction value) suitable for a color temperature which is lower than the above described first color temperature by one step (second color temperature) and a white balance correction value (third correction value) suitable for a color temperature which is higher than the above described first color temperature by one step (third color temperature).

Subsequently, this color temperature information is inputted from the CPU 138 to the system controller 52, and the bracketing shooting is realized as described above.

In this way, similarly to the case of setting the color temperature selection for the color bracketing shooting to "AUTO", also in the case of setting the color temperature selection for the color bracketing shooting to "M", the color bracketing shooting is realized in which the shooting is continuously performed so that the first frame is shot with the strobe light emission at the first color temperature, the second frame is shot with the strobe light emission at the second color temperature, and the third frame is shot with the strobe light emission at the third color temperature.

Here, a bracketing correction step and the memory 25 will be described by using FIG. 13.

FIG. 13 is a graph representing a relationship between the color temperature and a ratio of three primary colors RGB, in which a horizontal axis shows an absolute temperature (K) and a vertical axis shows relative intensity of each of R, G and B components. In FIG. 13, relative intensity at color temperature of 5000K is used as a reference.

As is apparent from FIG. 13, the RGB ratio varies precipitously in an area of the low color temperature, while the RGB ratio varies gradually in an area of the high color temperature.

Hence, if a bracketing amount (correction step) for the color bracketing is equally set both when the central color temperature for the bracketing shooting is the low color temperature and when the central color temperature for the bracketing shooting is the high color temperature, a magnitude of an effect (visual variation) differs even when the color bracketing shooting has been performed with the same step amount.

In this embodiment, a step of splitting the color temperature is varied depending on a range of the color temperature. Specifically, the splitting step is 100K/step (100K per step) in a range of 4500K and below, the splitting step is 250K/step in a range of 4500K to 6500K, and the splitting step is 500K/step in a range of 6500K and above.

In this way, the variation of the color in one step becomes visually equal regardless of a color temperature zone at which the bracketing shooting is performed.

Moreover, as described above, the RGB ratio data with respect to the color temperature is stored in the memory 25. If the color temperature is equally split both at the time of the low color temperature and at the time of the high color temperature and the data is stored, since the RGB ratio varies gradually with respect to the color temperature on the high color temperature side, the memory is wastefully used.

In this embodiment, the step of splitting the color temperature in data to be stored is varied depending on the range of the color temperature so that the memory can be efficiently used.

As described above, the system controller 52 reads the RGB ratio corresponding to a desired color temperature from the memory 25. More specifically, the system controller 52 reads an RGB ratio corresponding to a color temperature closest to the desired color temperature among color temperature steps stored in the memory.

In this way, in this embodiment, although the RGB ratio corresponding to the closest color temperature is read, the RGB ratio corresponding to the closest color temperature on the low temperature side may be read, or conversely, the RGB ratio corresponding to the closest color temperature on the high temperature side may be read.

Moreover, the RGB ratio corresponding to the closest color temperature on the low temperature side and the RGB ratio corresponding to the closest color temperature on the high temperature side may be read respectively, an RGB ratio in which these two read RGB ratios are interpolated with the desired color temperature may be calculated, and this calculated RGB ratio may be used to perform the strobe light emission. For example, if the desired color temperature is 4220K, since the RGB ratio corresponding to the color temperature is stored in the memory in 100K/step in the range of 4500K and below as described above, the RGB ratio at 4200 k, which is the closest color temperature on the low temperature side, and the RGB ratio at 4300K, which is the closest color temperature on the high temperature side, may be read respectively, and an RGB ratio in which these two RGB ratios have been interpolated at 4:1 may be used.

Second Embodiment

As a second embodiment related to the present invention, a camera not including a dedicated display related to the color temperature such as the color temperature measurement completion display lamp 201 or the color temperature set value mark 202 will be described.

Figure 14A:
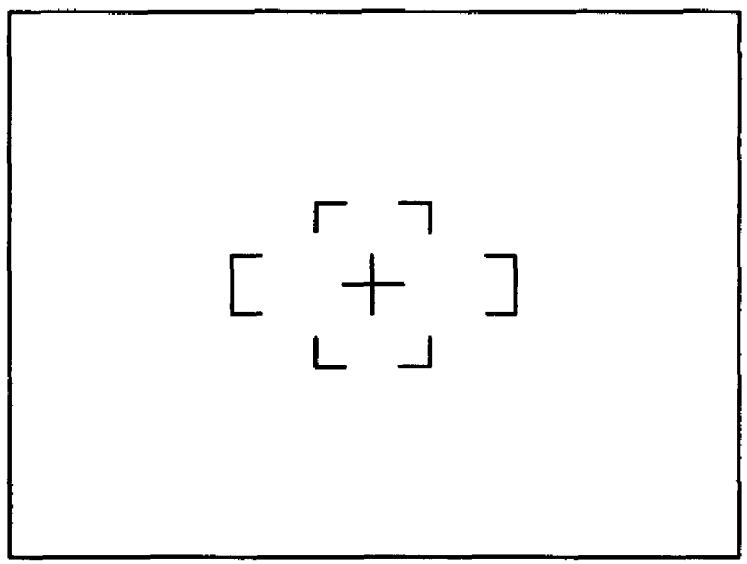
FIGS. 14A and 14B are views showing the display in the finder of the camera shown in FIG. 1.
Figure 14B:
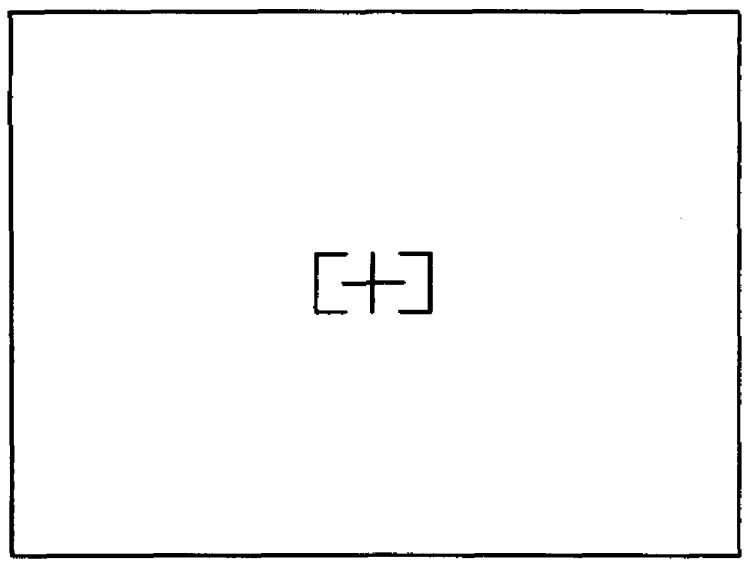

FIGS. 14A and 14B are displays in the LCD finder 103 of the camera not including the dedicated display related to the color temperature of the second embodiment related to the present invention.

A frame for a focus is displayed in the LCD finder 103. FIG. 14A is the display at a normal time and FIG. 14B is the display when the subject is in focus.

Here, the case of setting the color temperature selection for the color bracketing shooting to "M" (S12 in FIG. 8) will be described.

In the camera of the second embodiment related to the present invention, the frame for the focus in the LCD finder 103 is also used for the display of the matching of the color temperature of the subject field and the set color temperature (S27 in FIG. 11). In other words, the display becomes as shown in FIG. 14A when the color temperature of the subject field does not match the set color temperature, and the display becomes as shown in FIG. 14B when the color temperature of the subject field has matched the set color temperature.

In order to avoid confusion with the focus display, FIGS. 14A and 14B at the time of the color temperature display may be blinked.

Moreover, blink speed of FIG. 14A when the color temperature of the subject field does not match the set color temperature may be varied depending on a difference between the color temperature of the subject field and the set color temperature, instead of the color temperature position display at the time of setting the color temperature (S24 in FIG. 11).

Moreover, the display may be constantly as shown in FIG. 14A during setting the color temperature, and the display may be blinked only when the color temperature of the subject field has matched the set color temperature.

Moreover, instead of the display of the focus frame, another display may be also used for the matching display.

Moreover, instead of the display in the LCD finder 103, another display in the LCD monitor 152 may be also used.

Moreover, instead of the visual display, a sound announcement may be used.

Third Embodiment

The camera of a third embodiment related to the present invention will be described by using FIGS. 15 and 16.

Figure 15:
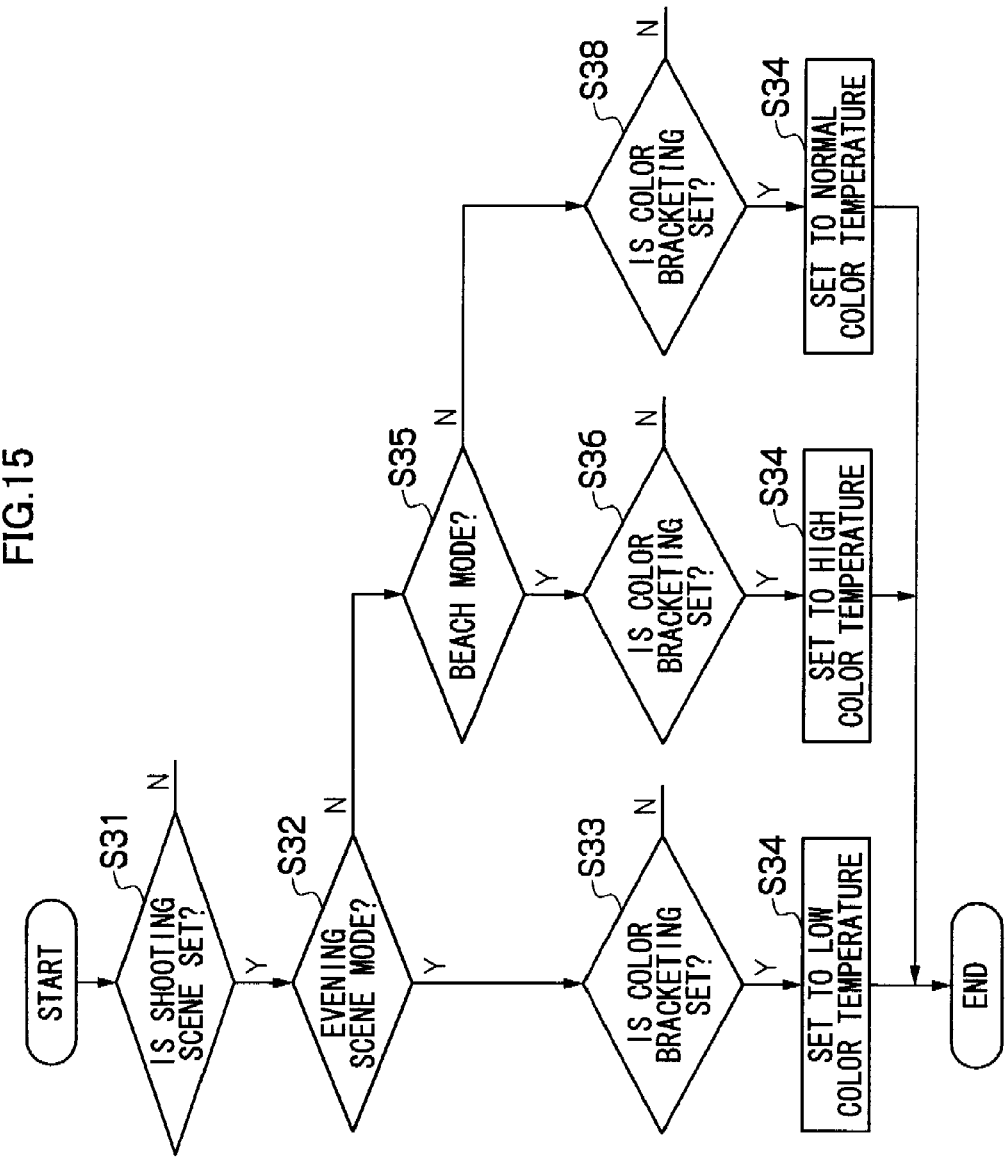
FIG. 15 is a flowchart showing the operations of the camera shown in FIG. 1.
Figure 16:
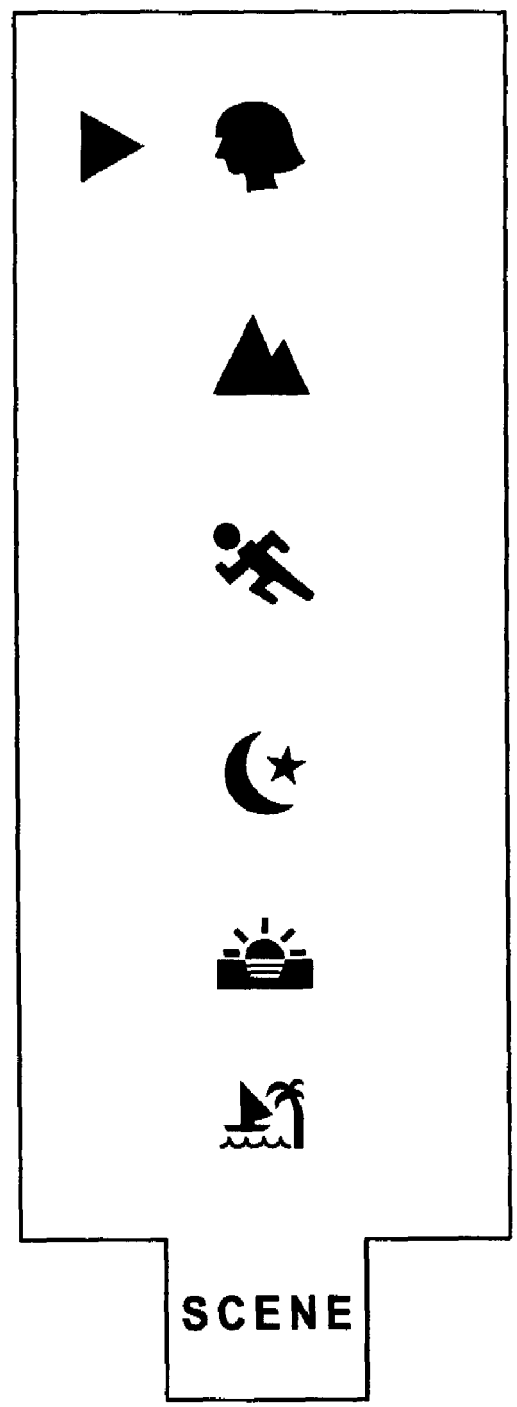
FIG. 16 is a view showing the LCD display screen of the camera shown in FIG. 1.

FIG. 15 is a flowchart representing operations of the camera of the third embodiment related to the present invention, and FIG. 16 is a display screen on the LCD monitor 152 of the camera of the third embodiment according to the present invention.

In the camera 100 of the third embodiment related to the present invention shown in FIG. 1, the mode dial 101 can be rotated to set to any shooting mode among the manual shooting mode, the auto shooting mode and a shooting scene selection mode.

When the mode dial 101 is set to the shooting scene selection mode (S31 in FIG. 15), a shooting scene selection screen shown in FIG. 16 is displayed on the LCD monitor 152.

A shooting scene can be selected among a person mode, a landscape mode, a sport mode, a night scene mode, an evening scene mode and a beach mode, and the cursor is moved up and down with the cross button 105 to select a desired item.

Here, the evening scene mode is a mode for shooting morning glow or evening glow vibrantly in red, and the beach mode is a mode for shooting at a beach under strong sunshine.

When the evening scene mode is selected with the cross button 105 (S32 in FIG. 15) and further the menu button 104 is used, the color bracketing shooting mode in the evening scene mode can be set (S33 in FIG. 15).

As described above, since the evening scene mode is the mode for shooting in red, it is conceivable that the strobe light is also preferably emitted in a color close to red, that is, at the low color temperature.

Hence, if the color bracketing shooting mode in the evening scene mode has been set, the color temperature for the strobe light emission is previously set to the low color temperature so that, for example, the above described first color temperature is 3000K, the above described second color temperature is 2900K, and the above described third color temperature is 3100K (S34 in FIG. 15).

Moreover, when the beach mode is selected with the cross button 105 (S35 in FIG. 15) and further the menu button 104 is used, the color bracketing shooting mode in the beach mode can be set (S36 in FIG. 15).

As described above, although the beach mode is the mode for shooting at the beach under the strong sunshine, since the beach includes a lot of ultraviolet rays and also blue sky is often reflected, it is conceivable that the strobe light is also preferably emitted in a color close to blue, that is, at the high color temperature.

Hence, if the color bracketing shooting mode in the beach mode has been set, the color temperature for the strobe light emission is previously set to the high color temperature so that, for example, the above described first color temperature is 10000K, the above described second color temperature is 9500K, and the above described third color temperature is 10500K (S37 in FIG. 15).

When the shooting scene other than the evening scene mode and the beach mode is selected with the cross button 105 and further the menu button 104 is used, the color bracketing shooting mode in that mode can be set.

In the shooting scene other than the evening scene mode and the beach mode, since it is conceivable that the color temperature of the subject field is normal, it is conceivable that the strobe light is also preferably emitted at a normal color temperature.

Hence, if the color bracketing shooting mode in the mode other than the evening scene mode and the beach mode has been set (S38 in FIG. 15), the color temperature for the strobe light emission is set to the normal color temperature so that, for example, the above described first color temperature is 5000K, the above described second color temperature is 4750K, and the above described third color temperature is 5250K (S39 in FIG. 15).

Based on this information, the operational amplifiers 46, 48 and 50 and the light control circuit 54 are set, and the color bracketing shooting is realized in which the shooting is continuously performed so that the first frame is shot with the strobe light emission at the first color temperature, the second frame is shot with the strobe light emission at the second color temperature, and the third frame is shot with the strobe light emission at the third color temperature.

What is claimed is:

1. A camera which continuously performs shooting at predetermined time intervals in conjunction with one shutter release operation, comprising:
a strobe light source which emits strobe light whose color temperature is adjustable;
a light emission control device which controls the strobe light source to emit the strobe light in synchronization with each shooting in the continuous shooting; and
a color temperature adjustment device which adjusts the color temperature of the strobe light emitted from the strobe light source for each shooting in the continuous shooting to vary color temperature with each shooting within a predetermined color temperature variable range which has been previously set, further comprising
a color temperature detection device which detects a color temperature of a subject field,
wherein the color temperature adjustment device adjusts the color temperature of the strobe light to vary color temperature within the predetermined color temperature variable range with the color temperature detected by the color temperature detection device at the center.

2. A camera which continuously performs shooting at predetermined time intervals in conjunction with one shutter release operation, comprising:
a strobe light source which emits strobe light whose color temperature is adjustable;
a light emission control device which controls the strobe light source to emit the strobe light in synchronization with each shooting in the continuous shooting; and
a color temperature adjustment device which adjusts the color temperature of the strobe light emitted from the strobe light source for each shooting in the continuous shooting to vary color temperature with each shooting within a predetermined color temperature variable range which has been previously set, further comprising
a color temperature setting device which manually sets the color temperature including a light source type,
wherein the color temperature adjustment device adjusts the color temperature of the strobe light to vary color temperature within the predetermined color temperature variable range with the color temperature set by the color temperature setting device at the center.

3. A camera which continuously performs shooting at predetermined time intervals in conjunction with one shutter release operation, comprising:
a strobe light source which emits strobe light whose color temperature is adjustable;
a light emission control device which controls the strobe light source to emit the strobe light in synchronization with each shooting in the continuous shooting; and
a color temperature adjustment device which adjusts the color temperature of the strobe light emitted from the strobe light source for each shooting in the continuous shooting to vary color temperature with each shooting within a predetermined color temperature variable range which has been previously set, further comprising
a scene selection device which selects a shooting scene, wherein
the color temperature adjustment device adjusts the color temperature of the strobe light to vary color temperature within the predetermined color temperature variable range, depending on the shooting scene selected by the scene selection device.

4. A camera which continuously performs shooting at predetermined time intervals in conjunction with one shutter release operation, comprising:
a strobe light source which emits strobe light whose color temperature is adjustable;
a light emission control device which controls the strobe light source to emit the strobe light in synchronization with each shooting in the continuous shooting;
a color temperature adjustment device which adjusts the color temperature of the strobe light emitted from the strobe light source for each shooting in the continuous shooting to vary color temperature with each shooting within a predetermined color temperature variable range which has been previously set, wherein the strobe light source comprises light emitting diodes of three colors of R, B and B; and
the color temperature adjustment device adjusts the color temperature by controlling a ratio of light emission amounts of R, G and B of the light emitting diodes of the three colors;
further comprising:
a storage device which stores the ratio of the light emission amounts of R, G and B of the light emitting diodes of the three colors for emitting the strobe light corresponding to each color temperature, for each color temperature at predetermined intervals,
wherein the color temperature adjustment device reads a corresponding ratio of the light emission amounts of R, G and B from the storage device depending on the color temperature at which the light emission should be performed, and controls each of light emission amounts of the light emitting diodes of the three colors to match the read ratio of the light emission amounts of R, G and B;
wherein the storage device stores the ratio of the light emission amounts of R, G and B with the predetermined intervals varied according to the color temperature.

5. A strobe device, comprising:
a strobe light source which emits strobe light whose color temperature is adjustable, and is configured with light emitting elements of three colors of R, G and B whose respective light emission amounts can be independently controlled;
a light emission control device which controls the strobe light source to emit the strobe light in synchronization with shooting;
a storage device which stores ratios of the light emission amounts of the light emitting elements of the three colors of R, G and B for emitting the strobe light corresponding to each color temperature, for each color temperature at predetermined intervals; and
a color temperature adjustment device which reads a corresponding ratio of the light emission amounts of R, G and B from the storage device depending on the color temperature at which the light emission should be performed, and adjusts the color temperature of the strobe light by controlling the respective light emission amounts of the light emitting elements of the three colors so that the respective light emission amounts of the light emitting elements of the three colors have the read ratio of the light emission amounts of R, G and B,
wherein the storage device stores the ratio of the light emission amounts of R, G and B with the predetermined intervals varied according to the color temperature.

6. The strobe device according to claim 5,
wherein the light emitting elements are light emitting diodes.

7. The strobe device according to claim 5,
wherein the storage device stores the ratio of the light emission amounts of R, G and B, with the predetermined intervals narrowed in a range of the color temperature in which the ratio of the light emission amounts of R, G and B widely varies with respect to variation in the color temperature, and with the predetermined intervals widened in a range of the color temperature in which the ratio of the light emission amounts of R, G and B insignificantly varies with respect to the variation in the color temperature.

8. The strobe device according to claim 5, further comprising
a color temperature detection device which detects a color temperature of a subject field,
wherein the color temperature adjustment device reads, from the storage device, a ratio of the light emission amounts of R, G and B corresponding to a color temperature closest to the color temperature detected by the color temperature detection device, or a color temperature closest to the color temperature detected by the color temperature detection device on a low temperature side, or a color temperature closest to the color temperature detected by the color temperature detection device on a high temperature side, and adjusts the color temperature of the strobe light by controlling the respective light emission amounts of the light emitting elements of the three colors to match the read ratio of the light emission amounts of R, G and B.

9. The strobe device according to claim 5, further comprising
a color temperature detection device which detects a color temperature of a subject field,
wherein the color temperature adjustment device reads ratios of the light emission amounts of R, G and B corresponding to a color temperature closest to the color temperature detected by the color temperature detection device on a low temperature side and a color temperature closest to the color temperature detected by the color temperature detection device on a high temperature side, respectively from the storage device, calculates a ratio of the light emission amounts of R, G and B by interpolating the read ratios of the light emission amounts of R, G and B with the detected color temperature, and adjusts the color temperature of the strobe light by controlling the respective light emission amounts of the light emitting elements of the three colors to match the calculated ratio of the light emission amounts of R, G and B.

10. A camera which shoots a subject and records image data of the shot subject, comprising:
a strobe light source which emits strobe light whose color temperature is adjustable, and is configured with light emitting elements of three colors of R, G and B whose respective light emission amounts can be independently controlled;
a light emission control device which controls the strobe light source to emit the strobe light in synchronization with shooting;

a storage device which stores ratios of the light emission amounts of the light emitting elements of the three colors of R, G and B for emitting the strobe light corresponding to each color temperature, for each color temperature at predetermined intervals; and a color temperature adjustment device which reads a corresponding ratio of the light emission amounts of R, G and B from the storage device depending on the color temperature at which the light emission should be performed, and adjusts the color temperature of the strobe light by controlling the respective light emission amounts of the light emitting elements of the three colors so that the respective light emission amounts of the light emitting elements of the three colors have the read ratio of the light emission amounts of R, G and B, wherein the storage device stores the ratio of the light emission amounts of R, G and B with the predetermined intervals varied according to the color temperature.

11. The camera according to claim 10, wherein the light emitting elements are light emitting diodes.

12. The camera according to claim 10, wherein the storage device stores the ratio of the light emission amounts of R, G and B, with the predetermined intervals narrowed in a range of the color temperature in which the ratio of the light emission amounts of R, G and B widely varies with respect to variation in the color temperature, and with the predetermined intervals widened in a range of the color temperature in which the ratio of the light emission amounts of R, G and B insignificantly varies with respect to the variation in the color temperature.

13. The camera according to claim 10, further comprising a color temperature detection device which detects a color temperature of a subject field, wherein the color temperature adjustment device reads, from the storage device, a ratio of the light emission amounts of R, G and B corresponding to a color temperature closest to the color temperature detected by the color temperature detection device, or a color temperature closest to the color temperature detected by the color temperature detection device on a low temperature side, or a color temperature closest to the color temperature detected by the color temperature detection device on a high temperature side, and adjusts the color temperature of the strobe light by controlling the respective light emission amounts of the light emitting elements of the three colors to match the read ratio of the light emission amounts of R, G and B.

14. The camera according to claim 10, further comprising a color temperature detection device which detects a color temperature of a subject field, wherein the color temperature adjustment device reads ratios of the light emission amounts of R, G and B corresponding to a color temperature closest to the color temperature detected by the color temperature detection device on a low temperature side and a color temperature closest to the color temperature detected by the color temperature detection device on a high temperature side, respectively from the storage device, calculates a ratio of the light emission amounts of R, G and B by interpolating the read ratios of the light emission amounts of R, G and B with the detected color temperature, and adjusts the color temperature of the strobe light by controlling the respective light emission amounts of the light emitting elements of the three colors to match the calculated ratio of the light emission amounts of R, G and B.

* * * * *